US008903227B2

(12) United States Patent
Hamada

(10) Patent No.: US 8,903,227 B2
(45) Date of Patent: Dec. 2, 2014

(54) INFORMATION PROCESSING APPARATUS, INFORMATION RECORDING MEDIUM, INFORMATION PROCESSING METHOD, AND PROGRAM

(75) Inventor: Toshiya Hamada, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/636,142

(22) PCT Filed: Mar. 28, 2011

(86) PCT No.: PCT/JP2011/057534
§ 371 (c)(1),
(2), (4) Date: Sep. 20, 2012

(87) PCT Pub. No.: WO2011/125572
PCT Pub. Date: Oct. 13, 2011

(65) Prior Publication Data
US 2013/0011117 A1    Jan. 10, 2013

(30) Foreign Application Priority Data

Apr. 8, 2010 (JP) ................................. 2010-089445

(51) Int. Cl.
*H04N 5/92* (2006.01)
*H04N 5/917* (2006.01)

(51) Int. Cl.
(52) U.S. Cl.
CPC ......... *H04N 9/8277* (2013.01); *H04N 13/0055* (2013.01); *G11B 2220/2541* (2013.01); *G11B*
(Continued)

(58) Field of Classification Search
CPC . H04N 1/00; H04N 2005/00; H04N 2101/00; H04N 2213/00; G11B 27/34; G11B 27/034; G11B 27/105; G11B 27/10

USPC .......... 386/326, 331, 335, 336, 338, 353, 356
See application file for complete search history.

(56) References Cited

U.S. PATENT DOCUMENTS 6,925,250 B1  8/2005 Oshima et al.
8,164,619 B2 * 4/2012 Sasaki et al. .................... 348/42
(Continued)

FOREIGN PATENT DOCUMENTS

| JP | 11 191895 | 7/1999 | |
| WO | 2009 133714 | 11/2009 | |
| WO | WO 2009/154033 | * 12/2009 | ............. H04N 5/917 |

OTHER PUBLICATIONS

International Search Report Issued Jun. 28, 2011 in PCT/JP11/57534 Filed Mar. 28, 2011.

(Continued)

*Primary Examiner* — Daquan Zhao
(74) *Attorney, Agent, or Firm* — Oblon, Spivak, McClelland, Maier & Neustadt, L.L.P.

(57) ABSTRACT

In processing of recording data on a recording medium, three-dimensional image discrimination data representing whether or not there is a possibility of a three-dimensional image being included in recorded data is recorded as management information. The three-dimensional image discrimination data is recorded in a clip information file set in association with a stream file as a storage file of image data, a playlist file including reproduction section designating information for the clip information file, a disc management file which directly or indirectly designates the playlist file, or the like. A reproducing apparatus can thereby easily determine the presence/absence of a three-dimensional image without performing analysis on reproduction target data.

16 Claims, 44 Drawing Sheets

| value | meaning |
|-------|---------|
| 0 | ONLY 2D CONTENT IS INCLUDED AND NO 3D CONTENT IS INCLUDED UNDER MANAGEMENT TARGET DIRECTORY |
| 1 | THERE IS POSSIBILITY OF 3D CONTENT BEING INCLUDED UNDER MANAGEMENT TARGET DIRECTORY |

(51) Int. Cl.
*H04N 5/93* (2006.01)
*H04N 13/00* (2006.01)
*G11B 27/32* (2006.01)
*G11B 27/10* (2006.01)
*H04N 5/89* (2006.01)
*H04N 9/82* (2006.01)
*H04N 5/781* (2006.01)
*H04N 5/85* (2006.01)
*H04N 9/806* (2006.01)

(52) U.S. Cl.
CPC .. 27/322 (2013.01); *H04N 13/0062* (2013.01); *H04N 9/8205* (2013.01); *G11B 27/105* (2013.01); *H04N 5/781* (2013.01); *H04N 13/0048* (2013.01); *H04N 13/0066* (2013.01); *H04N 5/85* (2013.01); *H04N 9/8063* (2013.01); *G11B 27/329* (2013.01)

USPC .......... 386/326; 386/331; 386/335; 386/336; 386/338; 386/353; 386/356

(56) References Cited

U.S. PATENT DOCUMENTS

2011/0038614 A1  2/2011  Chen et al.
2011/0044664 A1* 2/2011  Yukawa et al. .......... 386/328

OTHER PUBLICATIONS

U.S. Appl. No 13/638,771, filed Oct. 1, 2012, Hamada.
U.S. Appl. No 13/636,135, filed Sep. 20, 2012, Hamada.
U.S. Appl. No 13/637,309, filed Sep. 25, 2012, Hamada.
U.S. Appl. No 13/638,185, filed Sep. 28, 2012, Hamada.

* cited by examiner

FIG. 6

| Syntax | No. of bits | Mnemonic |
|---|---|---|
| info.bdav { | | |
|   type_indicator | 8*4 | bslbf |
|   version_number | 8*4 | bslbf |
|   TableOfPlayLists_start_address | 32 | uimsbf |
|   MakersPrivateData_start_address | 32 | uimsbf |
|   reserved_for_future_use | 192 | bslbf |
|   UIAppInfoBDAV() | | |
|   for(i=0; i<N1; i++){ | | |
|     padding_word | 16 | bslbf |
|   } | | |
|   TableOfPlayLists() | | |
|   for(i=0; i<N2; i++){ | | |
|     padding_word | 16 | bslbf |
|   } | | |
|   MakersPrivateData() | | |
|   for(i=0; i<N3; i++){ | | |
|     padding_word | 16 | bslbf |
|   } | | |
| } | | |

101
102
103 MAKER PRIVATE DATA AREA

FIG. 7

| Syntax | No. of bits | Mnemonic |
|---|---|---|
| MakersPrivateData() { | | |
|   length | 32 | uimsbf |
|   if(length !=0){ | | |
|     data_block_start_address | 32 | uimsbf |
|     reserved_for_word_align | 24 | bslbf |
|     number_of_maker_entries | 8 | uimsbf |
|     for (i=0; i<number_of_maker_entries; i++){ | | |
|       maker_ID | 16 | uimsbf |
|       maker_model_code | 16 | uimsbf |
|       mpd_start_address | 32 | uimsbf |
|       mpd_length | 32 | uimsbf |
|     } | | |
|     for (i=0; i<L1; i++) { | | |
|       padding_word | 16 | bslbf |
|       padding_word | 16 | bslbf |
|     } | | |
|     data_block | 32 + 8*(length - data_block_start_address) | |
|   } | | |
| } | | |

111: maker_ID
112: maker_model_code, mpd_start_address, mpd_length
113: data_block

FIG. 8

| Field name | Value |
|---|---|
| maker_ID | 0x2000 |
| maker_model_code | 0x0100 |

FIG. 9

| Syntax | No. of bits | Mnemonic |
|---|---|---|
| Multiview_video_info_for_Index() { | | |
|   length | 32 | uimsbf |
|   reserved_for_future_use | 32 | bslbf |
|   identifier | 128 | bslbf |
|   reserved_for_future_use | 15 | bslbf |
|   Index_multiview_video_flag | 1 | bslbf |
|   reserved_for_future_use | 16 | bslbf |
|   for (i=0; i< L1; i++) { | | |
|     reserved_for_future_use | 16 | bslbf |
|     reserved_for_future_use | 16 | bslbf |
|   } | | |
| } | | |

| value | meaning |
|---|---|
| 0 | ONLY 2D CONTENT IS INCLUDED AND NO 3D CONTENT IS INCLUDED UNDER MANAGEMENT TARGET DIRECTORY |
| 1 | THERE IS POSSIBILITY OF 3D CONTENT BEING INCLUDED UNDER MANAGEMENT TARGET DIRECTORY |

FIG. 11

| | Syntax | No. of bits | Mnemonic |
|---|---|---|---|
| | Multiview_video_info_for_PlayList() { | | |
| | length | 32 | uimsbf |
| | reserved_for_future_use | 32 | bslbf |
| | identifier | 128 | bslbf |
| | reserved_for_future_use | 15 | bslbf |
| 121 | PlayList_multiview_video_flag | 1 | bslbf |
| | reserved_for_future_use | 1 | bslbf |
| 122 | PlayList_multiview_video_configuration | 7 | uimsbf |
| | reserved_for_future_use | 2 | bslbf |
| 123 | PlayList_frame0_is_Left_flag | 6 | uimsbf |
| | reserved_for_future_use | 2 | bslbf |
| 124 | PlayList_base_view_is_Left_flag | 6 | uimsbf |
| | reserved_for_future_use | 2 | bslbf |
| 125 | PlayList_MainPath_is_Left_flag | 6 | uimsbf |
| | reserved_for_future_use | 6 | bslbf |
| 126 | PlayList_use_entropy_coding_mode_flag | 2 | uimsbf |
| | reserved_for_future_use | 6 | bslbf |
| 127 | PlayList_use_inter-view_prediction_flag | 2 | uimsbf |
| | reserved_for_future_use | 16 | bslbf |
| | for (i=0; i< L1; i++) { | | |
| | reserved_for_future_use | 16 | bslbf |
| | reserved_for_future_use | 16 | bslbf |
| | } | | |
| | } | | |

FIG. 12

| value | meaning |
|---|---|
| 0 | ONLY 2D CONTENT IS INCLUDED AND NO 3D CONTENT IS INCLUDED IN THIS PlayList |
| 1 | THERE IS POSSIBILITY THAT 3D CONTENT IS INCLUDED IN THIS PlayList<br>The value of PlayList_Multiview_video_configuration is valid |

FIG. 13

| value | meaning |
|---|---|
| 0 | reserved for "checkerboard" |
| 1 | reserved for "column based interleaving" |
| 2 | reserved for "row based interleaving" |
| 3 | side by side |
| 4 | top and bottom |
| 5 | frame sequential |
| 6-19 | reserved |
| 20 | no information |
| 21-29 | reserved |
| 30 | 2 elementary streams encoded by MVC, and 1 system stream (1 Clip AV stream file). |
| 31 | 2 elementary streams encoded by MVC, and 2 system streams (2 Clip AV stream files). |
| 32 | 1 elementary stream encoded by MVC and 1 system stream (1 Clip AV stream file). |
| 33-39 | reserved |
| 40 | Independent 2 elementary streams, and 1 system stream (1 Clip AV stream file). (Encoding method is not MVC.) |
| 41 | Independent 2 elementary streams, and 2 system streams (2 Clip AV stream files). (Encoding method is not MVC.) |
| 42-127 | reserved |

FIG. 14

| value | meaning |
|---|---|
| 0 | no information |
| 1 | reserved |
| 2 | frame 0 is Right view |
| 3 | frame 0 is Left view |
| 4-31 | reserved |

FIG. 15

| value | meaning |
|---|---|
| 0 | no information |
| 1 | reserved |
| 2 | base view is Right view |
| 3 | base view is Left view |
| 4-31 | reserved |

FIG. 16

| value | meaning |
|---|---|
| 0 | no information |
| 1 | reserved |
| 2 | MainPath is Right view |
| 3 | MainPath is Left view |
| 4-31 | reserved |

FIG. 18

| value | meaning |
|---|---|
| 0 | no information |
| 1 | entropy coding mode is not used at all |
| 2 | entropy coding mode may be used |
| 3 | reserved |

FIG. 19

| value | meaning |
|---|---|
| 0 | no information |
| 1 | inter-view prediction is not used at all |
| 2 | inter-view prediction may be used |
| 3 | reserved |

FIG. 20

| Syntax | No. of bits | Mnemonic |
|---|---|---|
| PlayList() { | | |
|   length | 32 | uimsbf |
|   reserved_for_word_align | 12 | bslbf |
|   PL_CPI_type | 4 | bslbf |
|   number_of_PlayItems | 16 | uimsbf |
|   if ((Virtual-PlayList) && PL_CPI_type==1) { | | |
|     number_of_SubPlayItems | 16 | uimsbf |
|   }else{ | | |
|     reserved_for_word_align | 16 | bslbf |
|   } | | |
|   for (PlayItem_id=0; PlayItem_id<number_of_PlayItems; PlayItem_id++) { | | |
|     PlayItem() | | |
|   } | | |
|   if ((Virtual-PlayList) && PL_CPI_type==1) { | | |
|     for (i = 0; i < number_of_SubPlayItems; i++) { | | |
|       SubPlayItem() | | |
|     } | | |
|   } | | |
| } | | |

141 { (PlayItem loop)
142 { (SubPlayItem loop)

FIG. 21

| Syntax | No. of bits | Mnemonic |
|---|---|---|
| SubPlayItem() { | | |
|   length | 16 | uimsbf |
|   Clip_Information_file_name | 8*5 | bslbf |
|   Clip_codec_identifier | 8*4 | bslbf |
|   reserved_for_future_use | 8 | bslbf |
|   SubPlayItem_type | 8 | bslbf |
|   ref_to_STC_id | 8 | uimsbf |
|   SubPlayItem_IN_time | 32 | uimsbf |
|   SubPlayItem_OUT_time | 32 | uimsbf |
|   sync_PlayItem_id | 16 | uimsbf |
|   sync_start_PTS_of_PlayItem | 32 | uimsbf |
| } | | |

FIG. 22

| SubPlayItem_type | Meaning |
|---|---|
| 0 | reserved for future use |
| 1 | Auxiliary audio stream path |
| 2 | Secondary view video stream path |
| 3 ? 255 | reserved for future use |

FIG. 23

| Syntax | | No. of bits | Mnemonic |
|---|---|---|---|
| zzzzz.clpi { | | | |
| | type_indicator | 8*4 | bslbf |
| | version_number | 8*4 | bslbf |
| | SequenceInfo_start_address | 32 | uimsbf |
| | ProgramInfo_start_address | 32 | uimsbf |
| | CPI_start_address | 32 | uimsbf |
| | ClipMark_start_address | 32 | uimsbf |
| | MakersPrivateData_start_address | 32 | uimsbf |
| | reserved_for_future_use | 96 | bslbf |
| 201 { | ClipInfo() | | |
| | for(i=0; i<N1; i++){ | | |
| |     padding_word | 16 | bslbf |
| | } | | |
| 202 { | SequenceInfo() | | |
| | for(i=0; i<N2; i++){ | | |
| |     padding_word | 16 | bslbf |
| | } | | |
| 203 { | ProgramInfo() | | |
| | for(i=0; i<N3; i++){ | | |
| |     padding_word | 16 | bslbf |
| | } | | |
| 204 { | CPI() | | |
| | for(i=0; i<N4; i++){ | | |
| |     padding_word | 16 | bslbf |
| | } | | |
| 205 { | ClipMark() | | |
| | for(i=0; i<N5; i++){ | | |
| |     padding_word | 16 | bslbf |
| | } | | |
| 206 { | MakersPrivateData() | | |
| | for(i=0; i<N6; i++){ | | |
| |     padding_word | 16 | bslbf |
| | } | | |
| } | | | |

FIG. 25

| Syntax | No. of bits | Mnemonic |
|---|---|---|
| ProgramInfo() { | | |
|    length | 32 | uimsbf |
|    reserved_for_word_align | 8 | bslbf |
|    num_of_program_sequences | 8 | uimsbf |
|    for(i=0; i<*num_of_program_sequences*; i++){ | | |
|       SPN_program_sequence_start*[i]* | 32 | uimsbf |
|       program_map_PID*[i]* | 16 | bslbf |
|       num_of_streams_in_ps*[i]* | 8 | uimsbf |
|       num_of_groups*[i]* | 8 | uimsbf |
|       for (stream_index=0; stream_index < num_of_streams_in_ps[i]; stream_index++) { | | |
|          stream_PID*[i][stream_index]* | 16 | uimsbf |
|          StreamCodingInfo(*i, stream_index*) | | |
|       } | | |
|       if (*num_of_groups[i]* > 1) { | | |
|          for(j=0; j<*num_of_groups[i]*; j++) { | | |
|             num_of_streams_in_group*[i][j]* | 8 | uimsbf |
|             for (k=0; k<*num_of_streams_in_group[i][j]*;k++) { | | |
|                ref_to_stream_index*[i][j][k]* | 8 | uimsbf |
|             } | | |
|             if (num_of_streams_in_group*[i][j]*%2==0) { | | |
|                reserved_for_word_align | 8 | bslbf |
|             } | | |
|          } | | |
|       } | | |
|    } | | |
| } | | |

FIG. 26

| Syntax | No. of bits | Mnemonic |
|---|---|---|
| CPI() { | | |
|    length | 32 | uimsbf |
|    reserved_for_word_align | 12 | bslbf |
|    CPI_type | 4 | uimsbf |
|    if (CPI_type == 1) { | | |
|       EP_map() | | |
|    } else if (CPI_type == 2) { | | |
|       TU_map() | | |
|    } | | |
| } | | |

210 { brace spans the if/else if block }

FIG. 29

| | Syntax | No. of bits | Mnemonic |
|---|---|---|---|
| | Multiview_video_info_for_ClipInfo() { | | |
| | length | 32 | uimsbf |
| | reserved_for_future_use | 32 | bslbf |
| | identifier | 128 | bslbf |
| | reserved_for_future_use | 16 | bslbf |
| | reserved_for_future_use | 8 | bslbf |
| 220 | number_of_program_sequences | 8 | uimsbf |
| | for(i=0; i<*number_of_program_sequences*; i++){ | | |
| | reserved_for_future_use | 15 | bslbf |
| 221 | ClipInfo_multiview_video_flag[i] | 1 | bslbf |
| | reserved_for_future_use | 1 | bslbf |
| 222 | ClipInfo_multiview_video_configuration[i] | 7 | uimsbf |
| | reserved_for_future_use | 2 | bslbf |
| 223 | ClipInfo_frame0_is_Left_flag[i] | 6 | uimsbf |
| | reserved_for_future_use | 2 | bslbf |
| 224 | ClipInfo_base_view_is_Left_flag[i] | 6 | uimsbf |
| | reserved_for_future_use | 2 | bslbf |
| 225 | ClipInfo_this_Clip_is_Left_flag[i] | 6 | uimsbf |
| | reserved_for_future_use | 6 | bslbf |
| 226 | ClipInfo_use_entropy_coding_mode_flag[i] | 2 | bslbf |
| | reserved_for_future_use | 6 | bslbf |
| 227 | ClipInfo_use_inter-view_prediction_flag[i] | 2 | bslbf |
| | reserved_for_future_use | 16 | bslbf |
| | } | | |
| | for (i=0; i< L1; i++) { | | |
| | reserved_for_future_use | 16 | bslbf |
| | reserved_for_future_use | 16 | bslbf |
| | } | | |
| | } | | |

FIG. 30

| value | meaning |
|---|---|
| 0 | ONLY 2D CONTENT IS INCLUDED AND NO 3D CONTENT IS INCLUDED IN THIS program_sequence<br>The value of ClipInfo_Multiview_video_configuration is invalid |
| 1 | THERE IS POSSIBILITY THAT 3D CONTENT IS INCLUDED IN THIS program_sequence<br>The value of ClipInfo_Multiview_video_configuration is valid |

FIG. 31

| value | meaning |
|---|---|
| 0 | reserved for "checkerboard" |
| 1 | reserved for "column based interleaving" |
| 2 | reserved for "row based interleaving" |
| 3 | side by side |
| 4 | top and bottom |
| 5 | frame sequential |
| 6-19 | reserved |
| 20 | no information |
| 21-29 | reserved |
| 30 | 2 elementary streams encoded by MVC, and 1 system stream. (This Clip includes both of the 2 elementary streams encoded by MVC). |
| 31 | 2 elementary streams encoded by MVC, and 2 system streams. (This Clip includes one of the 2 elementary streams encoded by MVC) |
| 32 | 1 elementary stream encoded by MVC and 1 system stream. |
| 33-39 | reserved |
| 40 | Independent 2 elementary streams, and 1 system stream. (This Clip includes both of the 2 elementary streams. Encoding method is not MVC.) |
| 41 | Independent 2 elementary streams, and 2 system streams. (This Clip includes one of the 2 elementary streams. Encoding method is not MVC.) |
| 42-127 | reserved |

FIG. 32

| value | meaning |
|---|---|
| 0 | no information |
| 1 | reserved |
| 2 | frame 0 is Right view |
| 3 | frame 0 is Left view |
| 4-31 | reserved |

FIG. 33

| value | meaning |
|---|---|
| 0 | no information |
| 1 | reserved |
| 2 | base view is Right view |
| 3 | base view is Left view |
| 4-31 | reserved |

FIG. 34

| value | meaning |
|---|---|
| 0 | no information |
| 1 | reserved |
| 2 | this Clip is Right view |
| 3 | this Clip is Left view |
| 4-31 | reserved |

FIG. 35

| value | meaning |
|---|---|
| 0 | no information |
| 1 | entropy coding mode is not used at all |
| 2 | entropy coding mode may be used |
| 3 | reserved |

FIG. 36

| value | meaning |
|---|---|
| 0 | no information |
| 1 | inter-view prediction is not used at all |
| 2 | inter-view prediction may be used |
| 3 | reserved |

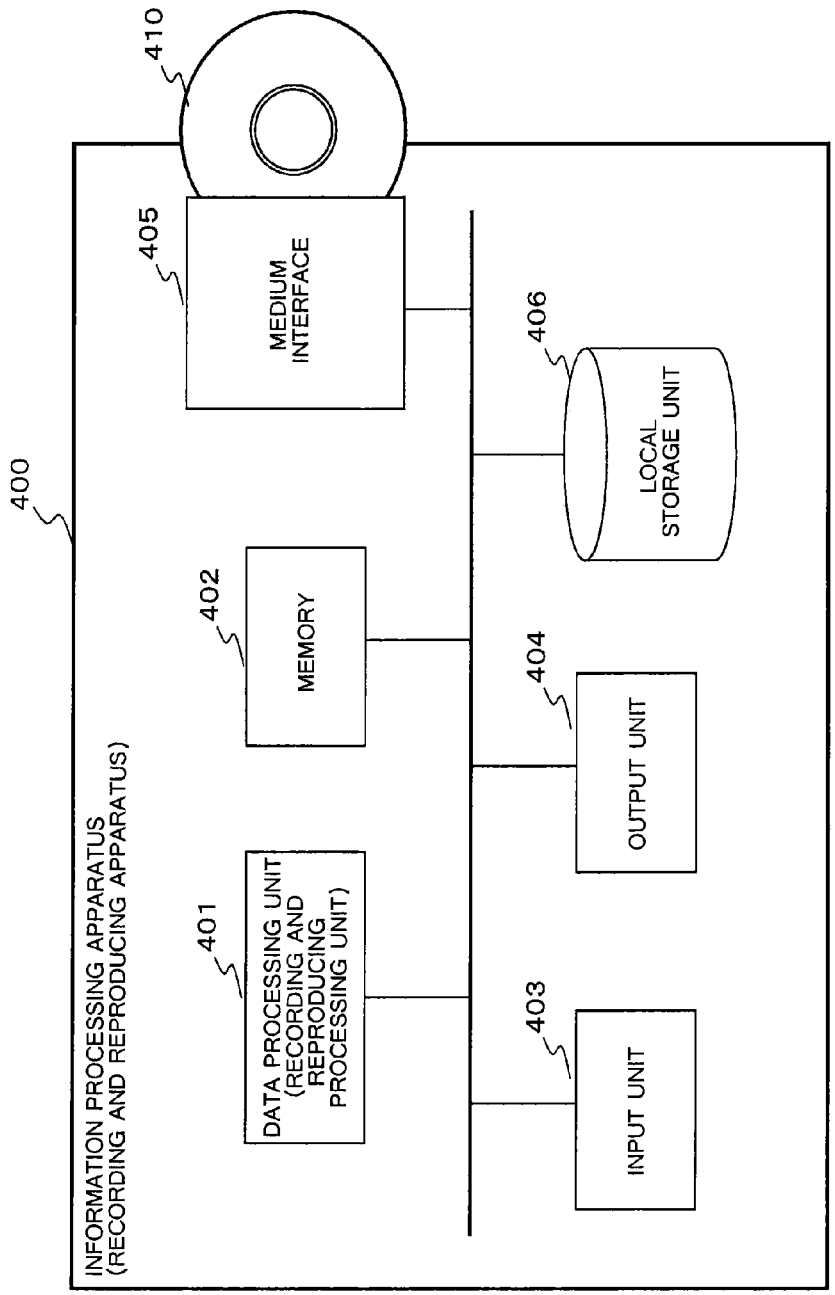

INFORMATION PROCESSING APPARATUS, INFORMATION RECORDING MEDIUM, INFORMATION PROCESSING METHOD, AND PROGRAM

TECHNICAL FIELD

The present invention relates to an information processing apparatus, an information recording medium, an information processing method, and a program. More specifically, the present invention relates to an information processing apparatus, an information recording medium, an information processing method, and a program for executing data recording processing and data reproduction processing of a three-dimensional image (3D image) using a recording medium such as a disc or flash memory.

BACKGROUND ART

Recently, a display apparatus such as a television, which can display three-dimensional images (3D images), a video camera, a still camera, and the like which can record three-dimensional images (3D images) have been developed and used. In relation to a 3D image, display processing is performed using captured images from different observing points, namely an image for a left eye and an image for a right eye. Accordingly, it is necessary to record a pair of the image for the left eye and the image for the right eye in recording a three-dimensional image to a medium, and reproduction is performed using the pair of images in reproduction processing.

There are various schemes as coding schemes performed in recording or transferring three-dimensional image data. For example, as representative schemes,
a Frame Sequential scheme,
a Side by Side scheme, and
a Top and Bottom scheme
are known.

The Frame Sequential scheme is a coding scheme in which frames of an image for a left eye (L image) and an image for a right eye (R image) are alternately recorded/transferred in an order of L, R, L, R, . . . .

The Side by Side scheme is a coding scheme in which the LR images are divided into a left part and a right part of one frame image and recorded/transferred.

The Top and Bottom scheme is a coding scheme in which the LR images are recorded/transferred while divided into an upper part and a lower part of one frame image.

At present, such various schemes are used in a mixed manner. For example, 3D content distributed by a certain broadcasting station for TV broadcasting is based on the Side by Side scheme. In addition, a recording scheme by a certain video camera is the Frame Sequential scheme. Under the present circumstance in which such various schemes are present in a mixed manner, it is necessary to record information for determining each scheme and control information and attribute information corresponding to each scheme when data is recorded in a video recorder, for example. In addition, it is necessary to determine each scheme and perform reproduction using control information and attribute information corresponding to each scheme in reproduction. However, there is a problem in that a recording area for the control information and the attribute information of such various three-dimensional image schemes is not set in some video recording and reproducing standards for the current medium.

For example, BDMV and BDAV standards (formats) are exemplified as video recording and reproducing application standards (formats). Such application standards are designed as data recording and reproducing application standards mainly using a BD (Blu-ray Disc (registered trademark)). In addition, descriptions of the BD standard are in Patent Document 1 (Japanese Unexamined Patent Application Publication No. 2002-158972) and Patent Document 2 (Japanese Unexamined Patent Application Publication No. 2007-179671), for example. Although BDMV and BDAV are data recording and reproducing application standards mainly using the BD, such standards can be applied to data recording and reproduction using a medium other than BD, such as flash memory, as well as the BD.

BDMV is an application standard developed for a BD-ROM which records movie content, for example, in advance and is widely used mainly in a non-rewritable BD-ROM of package content or the like. BDMV is characterized by being capable of storing on a disc a navigation command or BD-J as a program for controlling reproduction in response to a user operation and providing various interactive functions intended by content creators. In addition, BDMV is characterized by being capable of performing recording and reproduction using a menu screen configured by graphics and buttons.

The BDMV standard is an application standard for a BD-ROM which mainly records in advance movie content or the like as described above and has a specification according to which various kinds of control information and attribute information unique to content can be recorded such that recording and reproduction of content as intended by the content creators can be made. Control information and attribute information necessary for recording and reproducing three-dimensional images can be also recorded based on the BDMV standard, and BDMV standard-adaptive discs which record 3D content therein have already been provided to users.

In addition, the BDA (Blu-ray Disc Association) announced in December 2009 that a specification of Blu-ray 3D relating to a BD-adaptive three-dimensional image recording and reproducing scheme was finally determined, and an environment in which consumers enjoy 3D experiences at home is being prepared. In relation to this specification, description is in Non-patent Document 1 [http://www.blu-raydisc.com/jp/Press/PressRelease.html]. This specification is based on an expanded BDMV standard according to which 3D content can be stored on a BD-ROM as a read-only medium and defined as "BD-ROM Part 3 ver. 2.4".

On the other hand, BDAV is a standard which was developed for the purpose of being applied to data recording and reproducing processing mainly using a rewritable BD-RE type disc, a BD-R type disc which is recordable only once, or the like. BDAV is used when a user records video captured by a video camera or the like in a BD-RE type disc or a BD-R type disc and reproduces the video therefrom, for example. Alternatively, the BDAV is used for recording television broadcasting in a video recorder or the like and reproducing the television broadcasting. However, since the BDAV standard allows the user to easily record data, the BDAV has a trait that the BDAV is not suitable for recording and reproducing complex control information. For example, the BDAV standard has a trait that it has fewer interactive functions and fewer functions for realizing various kinds of control for recording and reproducing content as compared with BDMV.

Although it is possible to record and reproduce three-dimensional images based on the BDMV standard for the BD- ROM described above, a recording area for information necessary for recording and reproducing three-dimensional image content is not defined in the current BDAV standard. In addition, the recording area for information necessary for recording and reproducing three-dimensional image content is not defined in BD-RE Part 3 ver. 3. x which is not for a BD-ROM, is a data recording and reproducing application standard using a rewritable recording medium or a recording medium which is recordable only once, and is also referred to as a BDMV standard in the same manner as the BDAV standard.

Accordingly, there is a possibility that data necessary for reproducing three-dimensional images is lost and the three-dimensional images cannot be reproduced even when the three-dimensional image data captured by a camera capable of capturing three-dimensional images is recorded based on the BDAV standard. Similarly, there is a possibility that a problem occurs in which data necessary for reproducing three-dimensional images is lost and the three-dimensional images cannot be reproduced even when three-dimensional image content received as broadcasting waves is recorded in a BD recorder or the like based on the BDAV standard.

CITATION LIST

Patent Documents

Patent Document 1: Japanese Patent Application Laid-Open No. 2002-158972
Patent Document 2: Japanese Patent Application Laid-Open No. 2007-179671

Non-Patent Document

Non-patent Document 1: http://www.blu-raydisc.com/jp/Press/PressRelease.html

SUMMARY OF THE INVENTION

Problems to be Solved by the Invention

The present invention has been made in view of the aforementioned circumstances, and an object thereof is to provide an information processing apparatus, an information recording medium, an information processing method, and a program which realize recording of information necessary for recording and reproducing three-dimensional images and reproduction of the three-dimensional images using such information.

Furthermore, according to an embodiment of the present invention, an object is to provide an information processing apparatus, an information recording medium, and information processing method and program which makes it possible to record and reproduce three-dimensional images in data recording and reproducing processing with an application of a standard, in which a recording area for information necessary for recording and reproducing three-dimensional images is not defined, such as the BDAV standard.

Solution to Problems

A first aspect of the present invention is an information processing apparatus including: a data processing unit which performs processing of recording data on a recording medium, wherein the data processing unit executes processing of recording three-dimensional image discrimination data, which represents whether or not there is a possibility of a three-dimensional image being included in recorded data in units of management data in each of hierarchized management information files, in each of the management information files in the processing of recording data in the recording medium.

In addition, in one embodiment of the information processing apparatus of the present invention, the data processing unit records the three-dimensional image discrimination data in a different management information file from the recording file which stores three-dimensional image data therein.

In addition, in one embodiment of the information processing apparatus of the present invention, the data processing unit records the three-dimensional image discrimination data in a plurality of management information files of at least any among (a) to (c):
(a) clip information files set in association with stream files as storage files of image data;
(b) playlist files including reproduction section designating information for the clip information files; and
(c) disc management files for management of an entire disc.

In addition, in one embodiment of the information processing apparatus of the present invention, the data processing unit records the three-dimensional image discrimination data in all management information files shown from (a) to (c):
(a) clip information files set in association with stream files as storage files of image data;
(b) playlist files including reproduction section designating information for the clip information files; and
(c) disc management files for management of an entire disc.

In addition, in one embodiment of the information processing apparatus of the present invention, the data processing unit records three-dimensional image discrimination data representing that there is a possibility of a three-dimensional image being included in the clip information file when there is a possibility that the three-dimensional image is included in the stream file associated with the clip information file, the data processing unit records three-dimensional image discrimination data representing that there is a possibility of a three-dimensional image being included in the playlist file when there is a possibility that the three-dimensional image is included in the stream file reproduced using the playlist file, and the data processing unit records three-dimensional image discrimination data representing that there is a possibility of a three-dimensional image being included in the info file when there is a possibility that the three-dimensional image is included in a stream file reproduced using a playlist managed by the disc management file.

In addition, in one embodiment of the information processing apparatus of the present invention, the data processing unit records a flag, to which different values are set, as the three-dimensional image discrimination data when there is a possibility of a three-dimensional image being included in recorded data and when there is no possibility of a three-dimensional image being included in the recorded data.

Furthermore, a second aspect of the present invention is an information processing apparatus including: a data processing unit which performs processing of reproducing data from a recording medium, wherein the data processing unit sequentially reads three-dimensional image discrimination data from each of hierarchized management information files and executes processing of determining whether or not there is a possibility of a three-dimensional image being included in reproduction data in units of management data in each of the management information files based on the read three-dimensional image discrimination data in processing of reproducing data from the recording medium.

In addition, in one embodiment of the information processing apparatus of the present invention, the three-dimensional image discrimination data is set in each of the management information files shown from (a) to (c):
(a) clip information files set in association with stream files as storage files of image data;
(b) playlist files including reproduction section designating information for the clip information files; and
(c) disc management files for management of an entire disc, and
wherein the data processing unit refers to the three-dimensional image discrimination data set in the management information files selected in accordance with reproduction data in an order from an info file, a play list file, and then a clip information file and determines whether or not there is a possibility of a three-dimensional image being included in the reproduction data in units of management data in each of the management information files.

In addition, in one embodiment of the information processing apparatus of the present invention, the data processing unit sets a reproduction processing configuration of the information processing apparatus to a three-dimensional image reproduction processing configuration when it is determined that there is a possibility of a three-dimensional image being included in reproduction data in the processing of referring to the three-dimensional image discrimination data, and the data processing unit performs processing of setting the reproduction processing configuration of the information processing apparatus to a two-dimensional image reproduction processing configuration when it is determined that a three-dimensional image is not included in the reproduction data.

In addition, in one embodiment of the information processing apparatus of the present invention, the data processing unit performs processing of determining whether or not there is a possibility of a three-dimensional image being included in reproduction data in the processing of referring to the three-dimensional image discrimination data and displaying determination information on a display unit.

In addition, in one embodiment of the information processing apparatus of the present invention, the data processing unit performs processing of displaying determination information on whether or not there is a possibility of a three-dimensional image being included in reproduction data in units of titles of content stored in the recording medium.

Furthermore, a third aspect of the present invention is an information recording medium which stores image data, including, as recorded data: a stream file which stores content as a reproduction target; and a management information file with a hierarchy configuration, in which management information of the content is stored, wherein each of the hierarchized management information files has a configuration in which three-dimensional image discrimination data representing whether or not there is a possibility of a three-dimensional image being included in the content is recorded, and wherein a reproducing apparatus which reproduces the content has a configuration with which it is possible to determine whether or not there is a possibility of a three-dimensional image being included in recorded content in the information recording medium in units of management data in each of the management information files by sequentially referring to the three-dimensional image discrimination data based on a hierarchy of the management information files.

In addition, in one embodiment of the information recording medium of the present invention, the three-dimensional image discrimination data is set in each of the management information files shown from (a) to (c):
(a) clip information files set in association with stream files as storage files of image data;
(b) playlist files including reproduction section designating information for the clip information files; and
(c) disc management files for management of an entire disc, and
wherein the reproducing apparatus is capable of referring to the three-dimensional image discrimination data set in the management information files selected in accordance with reproduction data in an order from a disc management file, a play list file, and then a clip information file and determining whether or not there is a possibility of a three-dimensional image being included in the reproduction data in units of management data in each of the management information files.

Furthermore, a fourth aspect of the present invention is an information processing method for executing processing of recording data on a recording medium by an information processing apparatus, the method including: causing a data processing unit to execute processing of recording three-dimensional image discrimination data, which represents whether or not there is a possibility of a three-dimensional image being included in recorded data in units of management data in each of hierarchized management information files, in each of the management information files in processing of recording data on the recording medium.

Furthermore, a fifth aspect of the present invention is an information processing method for executing processing of reproducing data from a recording medium by an information processing apparatus, the method including: causing a data processing unit to execute processing of sequentially reading three-dimensional image discrimination data recorded in each of hierarchized management information files, which are stored on the recording medium, and determining whether or not there is a possibility of a three-dimensional image being included in reproduction data in units of management data in each of the management information files based on the read three-dimensional image discrimination data.

Furthermore, a sixth aspect of the present invention is a program which causes an information processing apparatus to execute processing of recording data on a recording medium, the program causing a data processing unit to execute: processing of recording three-dimensional image discrimination data, which represents whether or not there is a possibility of a three-dimensional image being included in recorded data in units of management data in each of hierarchized management information files, in each of the management information files in processing of recording data in the recording medium.

Furthermore, a seventh aspect of the present invention is a program which causes an information processing apparatus to execute processing of reproducing data from a recording medium, the program causing a data processing unit to: sequentially read three-dimensional image discrimination data stored in each of hierarchized management information files, which are stored in the recording medium, and execute processing of determining whether or not there is a possibility of a three-dimensional image being included in reproduction data in units of management data in each of the management information files based on the read three-dimensional image discrimination data.

In addition, the program of the present invention is a program provided to an information processing apparatus or a computer system, which is capable of executing various program codes, via a recording medium, for example. By a program executing unit in the image processing apparatus or the computer system executing the above program, processing in accordance with the program is realized.

Other objects, features, and advantages of the present invention can be clarified by detailed description based on embodiments of the present invention and the accompanying drawings which will be described later.

Effects of the Invention

According to an embodiment of the present invention, a data recording and reproducing configuration capable of easily determining whether or not a three-dimensional image is included in data stored on a recording medium is realized. In data recording processing on the recording medium, three-dimensional image discrimination data representing whether or not there is a possibility that the three-dimensional image is included in the recorded data is recorded as management information. Specifically, three-dimensional image discrimination data is recorded in a clip information file set in association with a stream file as an image data storage file, a playlist file with reproduction section designating information for the clip information file, a disc management file, which directly or indirectly designates the playlist file, and the like. With such a configuration, a reproducing apparatus can easily determine the presence/absence of the three-dimensional image without performing analysis on reproduction target data.

BRIEF DESCRIPTION OF DRAWINGS

FIG. 6 is a diagram showing the syntax of the info file [info.bdav] defined as a management information file (database file) in the BDAV standard.

FIG. 7 is a diagram illustrating the syntax of a maker private data area in the info file [info.bdav].

FIG. 8 is a diagram showing a recording example in a maker ID [maker_ID] recording area and a maker model code recording area in the maker private data area in the info file [info.bdav].

FIG. 9 is a diagram illustrating three-dimensional image information recorded in a data block [data_block] recording area in the maker private data area in the info file [info.bdav].

FIG. 10 is a diagram showing a specific example of the three-dimensional image information recorded in the data block [data_block] recording area in the maker private data area in the info file [info.bdav].

FIG. 11 is a diagram illustrating data in the data block in the maker private data area in the playlist file.

FIG. 12 is a diagram showing a specific example of the data recorded in the data block in the maker private data area in the playlist file.

FIG. 13 is a diagram showing a specific example of the data recorded in the data block in the maker private data area in the playlist file.

FIG. 14 is a diagram showing a specific example of the data recorded in the data block in the maker private data area in the playlist file.

FIG. 15 is a diagram showing a specific example of the data recorded in the data block in the maker private data area in the playlist file.

FIG. 16 is a diagram showing a specific example of the data recorded in the data block in the maker private data area in the playlist file.

FIG. 18 is a diagram showing a specific example of the data recorded in the data block in the maker private data area in the playlist file.

FIG. 19 is a diagram showing a specific example of the data recorded in the data block in the maker private data area in the playlist file.

FIG. 20 is a diagram showing the syntax of the playlist file.

FIG. 21 is a diagram showing the detailed syntax of recorded data in a sub path (sub play item) information recording area 142.

FIG. 22 is a diagram illustrating a specific example of the recorded data in the sub path (sub play item) information recording area in the playlist file.

FIG. 23 is a diagram showing the syntax of a clip information file.

FIG. 25 is a diagram showing the syntax of ProgramInfo in the clip information file.

FIG. 26 is a diagram showing the syntax of CPI in the clip information file.

FIG. 29 is a diagram illustrating a specific example of three-dimensional image information (multiview_video_info) recorded in the data block [data_block] recording area in the maker private data area in the clip information file.

FIG. 30 is a diagram showing a specific example of the three-dimensional image information recorded in the data block [data_block] recording area in the maker private data area in the clip information file.

FIG. 31 is a diagram showing a specific example of the three-dimensional image information recorded in the data block [data_block] recording area in the maker private data area in the clip information file.

FIG. 32 is a diagram showing a specific example of the three-dimensional image information recorded in the data block [data_block] recording area in the maker private data area in the clip information file.

FIG. 33 is a diagram showing a specific example of the three-dimensional image information recorded in the data block [data_block] recording area in the maker private data area in the clip information file.

FIG. 34 is a diagram showing a specific example of the three-dimensional image information recorded in the data block [data_block] recording area in the maker private data area in the clip information file.

FIG. 35 is a diagram showing a specific example of the three-dimensional image information recorded in the data block [data_block] recording area in the maker private data area in the clip information file.

FIG. 36 is a diagram showing a specific example of the three-dimensional image information recorded in the data block [data_block] recording area in the maker private data area in the clip information file.

FIG. 44 is a diagram illustrating a configuration example of the information processing apparatus according to an embodiment of the present invention.

MODE FOR CARRYING OUT THE INVENTION

Figure 1:
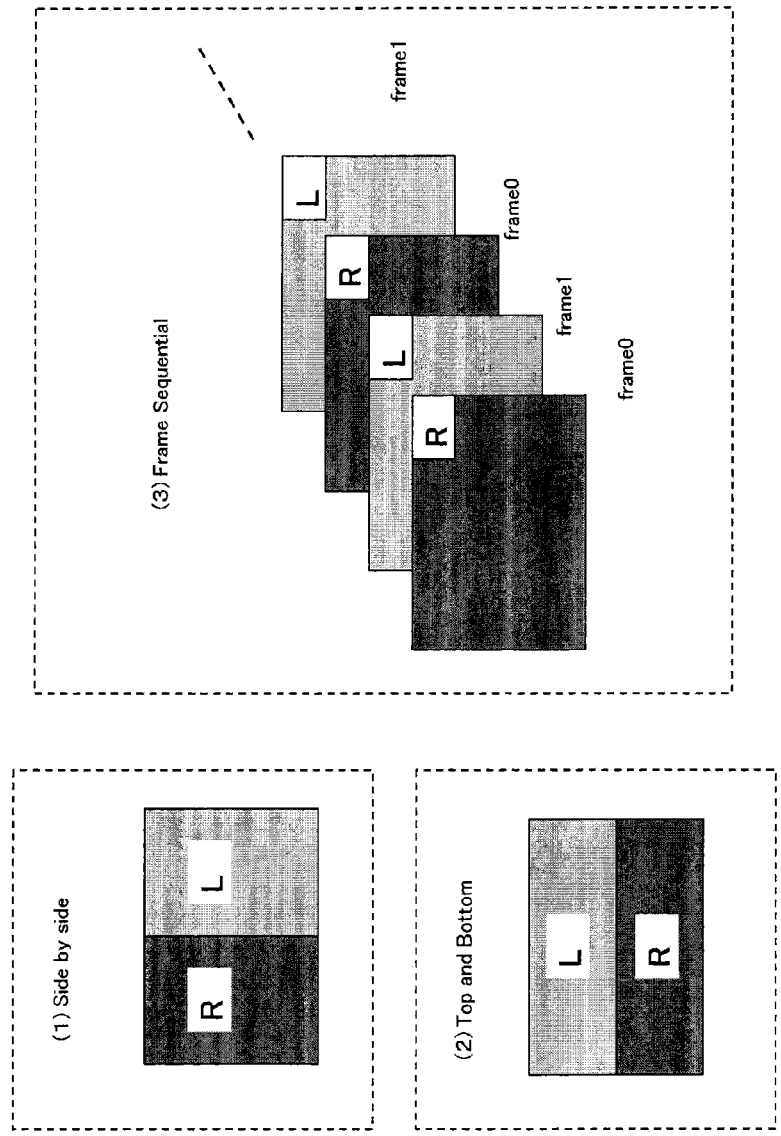
FIG. 1 is a diagram illustrating a coding scheme of a three-dimensional image.

Hereinafter, detailed description will be given of an information processing apparatus, an information recording medium, an information processing method and a program with reference to the drawings. Description will be given of the following items.
1. Outline Concerning Source of Three-Dimensional Image as Target of Recording and Reproducing Processing Using Recording Medium and Coding Scheme of Three-Dimensional Image
2. Outline of BDAV Standard
3. Concerning Recording Processing of Three-Dimensional Image Information and Reproduction Processing Using Recorded Three-Dimensional Image Information
3-1. Concerning Recording Processing and Utilizing Processing of Three-Dimensional Image Information Using Management Information File (Database File)
3-1-a. Example of Recording Three-Dimensional Image Information in Info File
3-1-b. Example of Recording Three-Dimensional Image Information in Playlist File
3-1-c. Example of Recording Three-Dimensional Image Information in Reproduction Path Information (Sub-Play Item Information) in Playlist File
3-1-d. Example of Recording Three-Dimensional Image Information in Clip Information File
4. Concerning Processing Sequence Executed by Information Processing Apparatus
4-1. Content Recording Processing Sequence
4-2. Recording/Updating Processing Sequence of Three-Dimensional Image Information in Clip Information File
4-3. Recording/Updating Processing Sequence of Frame Zero-Image Identification Flag and Base Image Identification Flag as Three-Dimensional Image Information in Clip Information File
4-4. Recording/Updating Processing Sequence of Three-Dimensional Image Information in Play List File
4-5. Content Additional Writing Processing Sequence
4-6. Content Editing Processing Sequence
4-7. Content Reproduction Processing Sequence
5. Concerning Configuration Example of Information Processing Apparatus

[1. Outline Concerning Source of Three-Dimensional Image as Target of Recording and Reproducing Processing Using Recording Medium and Coding Scheme of Three-Dimensional Image]

First, description will be given of an outline of a source as a provision source of a three-dimensional image which can be stored on various recording media such as a BD (Blu-ray Disc (registered trademark)) and flash memory and a coding scheme of a three-dimensional image which is currently used.

As providers of three-dimensional images which can be stored on a recording medium, the following providers can be exemplified:
(1) broadcasting content provided by a broadcasting business operator such as a television station;
(2) content captured by a video camera; and
(3) network distributed content provided via a communication network such as the Internet.

For example, such three-dimensional image content is recording content on the recording medium (a BD, a flash memory, or the like).

In recording or transferring processing of a three-dimensional image, coding processing based on a predetermined format is performed. Examples of coding schemes for a three-dimensional image will be described.

The following five coding schemes for a three-dimensional image will be described with reference to FIGS. 1 and 2.
(1) Side by Side scheme
(2) Top and Bottom scheme
(3) Frame Sequential scheme
(4) stream scheme (one or two streams) with inter-view reference (MVC)
(5) two-stream scheme without inter-view reference (1) The Side by Side scheme is a coding scheme in which LR images are divided into a left part and a right part in one frame image and recorded/transferred. In addition, the L image means an image for a left eye, and the R image means an image for a right eye.

(2) The Top and Bottom scheme is a coding scheme in which the LR images are divided into an upper part and a lower part in one frame image and recorded/transferred.

(3) The Frame Sequential scheme is a coding scheme in which frames of the image for the left eye (L image) and the image for the right eye (R image) are alternately recorded/transferred in an order of L, R, L, R, . . . .

(4) The stream scheme with inter-view reference (one or two stream) (MVC: Multi View Coding) is a scheme in which any one of the L image and the R image is set as a base view which is a reference image to be referred to in decoding processing and the other is set as a non-base view for which decoding is performed with reference to the reference image in the decoding processing. Arrows illustrated in the drawing are arrows representing images which are reference targets in decoding each image. The example shown in the drawing is an example in which the L image is set as a base view and the R image is set as a non-base view. This scheme is classified into a two-stream scheme in which the L image and the R image are set as individual streams and a one-stream scheme in which the L image and the R image are set as one mixed stream.

(5) The two-stream scheme without inter-view reference is a two-stream scheme, in which the L image and the R image are set as individual streams, which has a configuration in which only the L image is referred to in decoding the L image and only the R image is referred to in decoding the R image. The two-stream scheme without inter-view reference is a scheme which does not require inter-view reference from L to R or from R to L.

There are various coding schemes as described above as coding schemes of a three-dimensional image, and schemes used for broadcasting content, video recording content, and the like are not unified under the current circumstances. Therefore, it is necessary to record information with which such a scheme can be determined and record various kinds of control information and attribute information in accordance with the scheme when a three-dimensional image is recorded on a medium, for example, and it is necessary to execute coding processing in accordance with the scheme, three-dimensional coding scheme information of which recorded on the medium has been read, in the reproduction thereof.

[2. Outline of BDAV Standard]

Next, description will be given of an outline of the BDAV standard which is data recording and reproducing standard (format) using a recording medium such as a BD (Blu-ray Disc (registered trademark)).

As described above, the BDMV standard and the BDAV standard are data recording and reproducing application standards using a BD (Blu-ray Disc (registered trademark)).

In addition, these standards are standards which can also be applied to data recording and reproducing using other media such as flash memory as well as the BD.

The BDMV is an application standard developed for a BD-ROM which records movie content, for example, in advance.

The BDAV is an application standard developed for the purpose of being used for a rewritable BD-RE and a BD-R which can be recordable only once.

Figure 3:
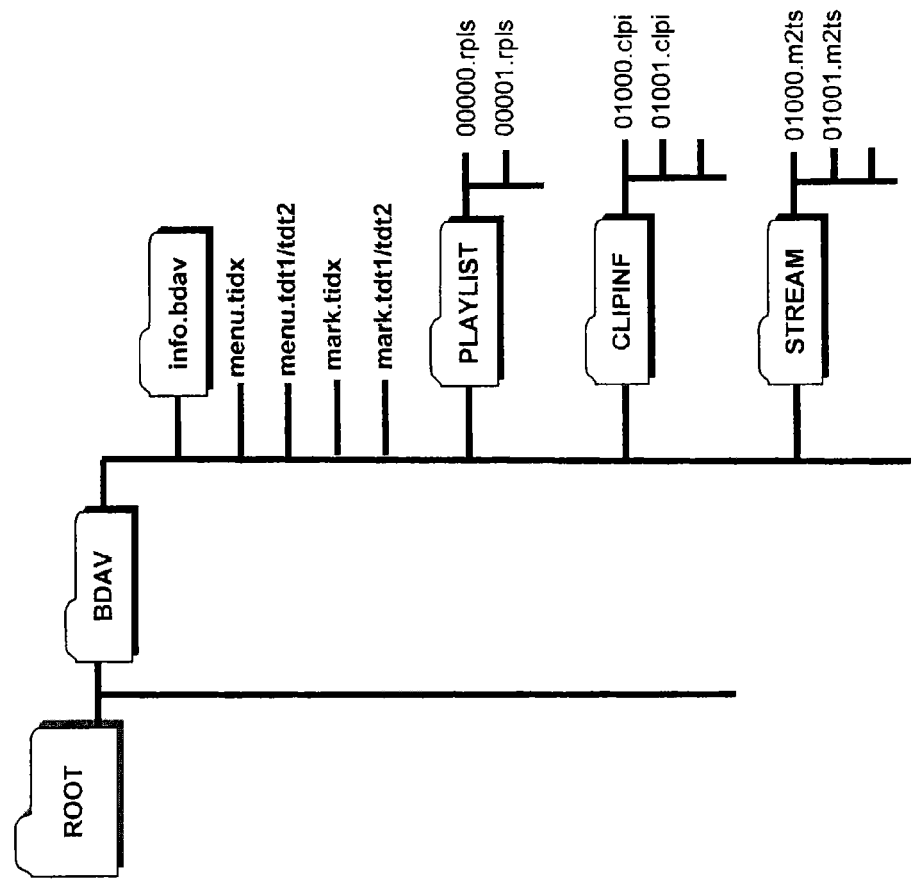
FIG. 3 is a diagram illustrating a BDAV directory which is a data recording configuration which is recorded on a medium based on a BDAV standard.

Referring to FIG. 3, description will be given of a BDAV directory which is a data recording configuration recorded on a medium based on the BDAV standard. There are various versions in the BDAV standard, and the BDAV which will be described below is adapted to a BD-RE 2.1 standard. As shown in FIG. 3, a directory [BDAV] is placed under a root directory.

Right under the directory [BDAV], an info file [info.bdav], menu files [menu.tidx] and [menu.tdt1/tdt2], and mark files [mark.tidx] and [mark.tdt1/tdt2] are recorded.

Furthermore, as lower directories of the BDAV directory [BDAV],
a playlist directory [PLAYLIST],
a clip information directory [CLIPINF], and
a stream directory [STREAM]
are set.

A playlist file [xxxxx.mpls] is set in the playlist directory [PLAYLIST], a clip information file [xxxxx.clpi] is set in the clip information directory [CLIPINF], and an AV stream file [xxxxx.m2ts] is set in the stream directory [STREAM].

The info file [info.bdav] is a file based on the BDAV standard, is a file which manages the entire disc, and is a file which has a playlist table. On the other hand, the index file is a file based on the BDMV standard, which similarly manages the entire disc, and which has a movie object table. Since a play list file is designated from the movie objects, the index file is a file which indirectly designates the playlist. In addition, the info file and the index file are common in a point of managing the entire disc. For this reason, when it is necessary to record various kinds of 3D data in the BDMV format, the 3D data may be recorded in the index file instead of the info file in the same manner as in addition in the BDAV format which will be described below.

The menu files [menu.tidx] and [menu.tdt1/tdt2] store thumbnail images of representative images in the AV stream file, respectively. [menu.tidx] stores thumbnail management information, and [menu.tdt1/tdt2] stores thumbnail images.

The BDAV standard does not have a function of creating a menu including various kinds of information unlike the BDMV standard and is set so as to perform simplified menu display of displaying top images of movies captured by a user as thumbnails, for example. The menu files [menu.tidx] and [menu.tdt1/tdt2] manage and store the thumbnail images therefor.

The mark files [mark.tidx] and [mark.tdt1/tdt2] are files which manage and store thumbnail images corresponding to mark positions as index information set in editing processing and the like on images captured by the user (AV stream file). [mark.tidx] stores thumbnail management information, and [mark.tdt1/tdt2] stores the thumbnail images.

The playlist file [xxxxx.mpls] is set in the playlist directory [PLAYLIST], the clip information file [xxxxx.clpi] is set in the clip information directory [CLIPINF], and the clip AV stream file [xxxxx.m2ts] is set in the stream directory [STREAM].

Files from the info file to the clip information file are management information files applied to reproduction of data stored in the clip AV stream file. These management information files are also referred to as database files or databases.

The info file is a management information file for recorded data in the entire medium. In the info file, a playlist table is recorded as described above. First, the info file is read when a medium (information recording medium) is mounted on a recording and reproducing apparatus, and a menu including titles is displayed based on information described in the info file. The user can select a title in the menu and perform selective content reproduction.

The playlist file [xxxxx.mpls] recorded in the playlist directory [PLAYLIST] is set corresponding to titles to be shown to the user and is a reproduction list configured by at least one or more reproduction path information items (play items). Each reproduction path information item (play item) is a reproduction section designating information including a reproduction start point (IN point) and a reproduction end point (OUT point) for a clip. It is possible to designate a reproduction order of each reproduction section by aligning a plurality of reproduction path information items (play items) in a plurality of playlists on a time axis.

The clip information file [xxxxx.clpi] recorded in the clip information directory [CLIPINF] is set corresponding to the AV stream file [xxxxx.m2ts] recorded in the stream directory [STREAM]. The clip information file is a file in which information relating to a stream necessary for reproducing an actual stream is described.

The AV stream file [xxxxx.m2ts] recorded in the stream directory [STREAM] is a file on which streams including image data coded based on various coding schemes are stored. In addition, the AV stream file [xxxxx.m2ts] is also referred to as a clip AV stream file. Three-dimensional image data is also stored on this AV stream file (=clip AV stream file).

The clip information file [xxxxx.clpi] recorded in the clip information directory [CLIPINF] and the AV stream file are collectively referred to as a clip in some cases.

As described above, the info file to the clip information file are management information files which are applied to reproduction of data stored on the clip AV stream file. The management information files have a hierarchical structure in which one or more playlist files are set at a lower rank than the info file and one or more clip information files are set at a lower rank than each playlist file. That is, a plurality of different management information files are hierarchized in the setting. In the configuration of the present invention, three-dimensional image information is recorded in each of such hierarchized management information files, and the three-dimensional image information is sequentially read and used from these hierarchized management information files in reproducing content from the medium.

The reproducing apparatus reads the three-dimensional image information in an order of the info file, the play list file, and the clip information file, for example, and obtains and uses detailed information on whether or not a three-dimensional image is included in reproduction target content or on a coding state of the three-dimensional image. In addition, this processing will be described later.

Figure 4:
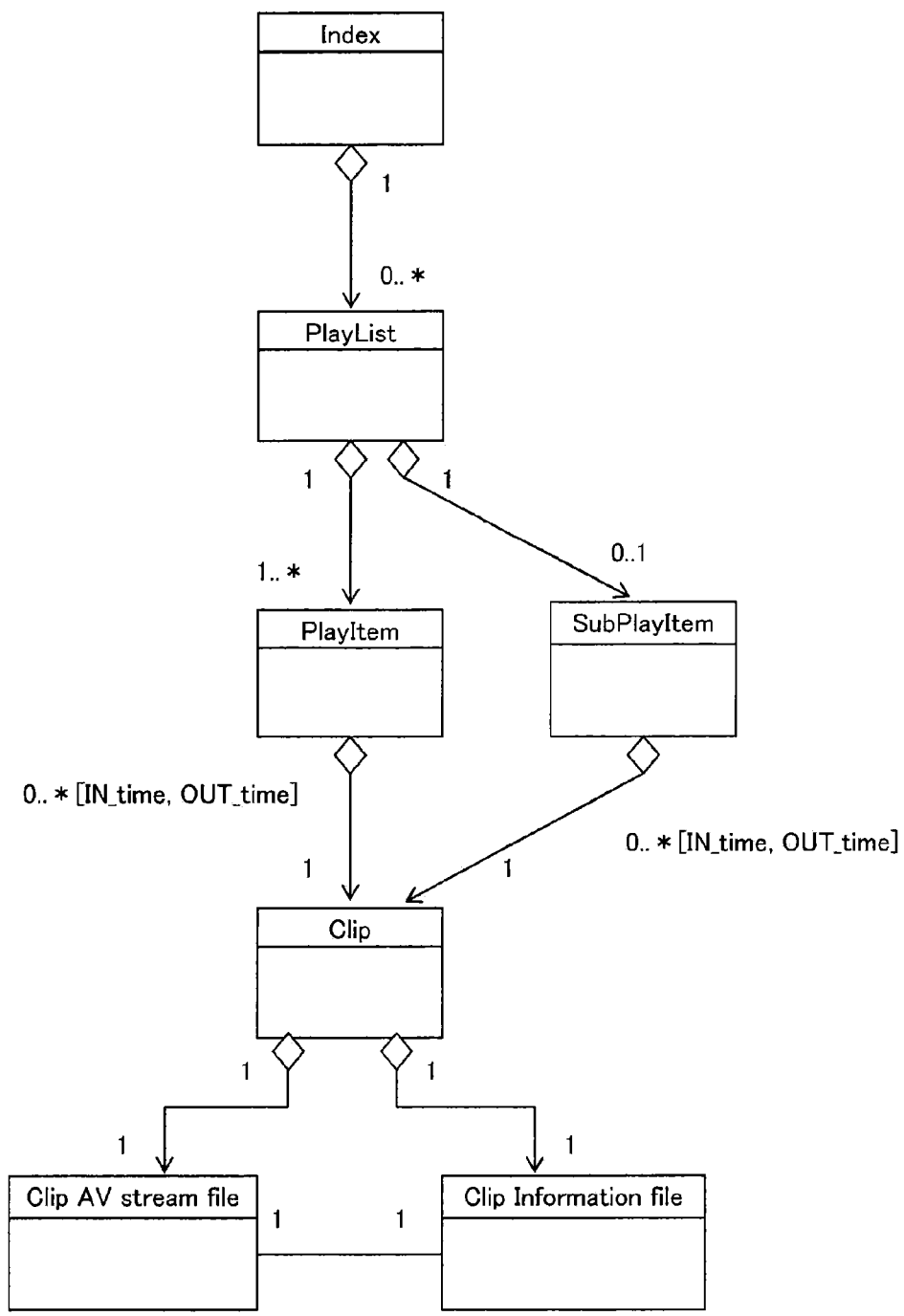
FIG. 4 is a diagram illustrating a data management configuration based on a database file (Info file [info.bdav]): clip information file) as management information included in the BDAV standard.

Referring to FIG. 4, description will be given of a data management configuration based on database files (the info file to the clip information file) as management information included in the BDAV standard. FIG. 4 is a UML (Unified Modeling Language) diagram showing relationships among a clip AV stream, clip information, a clip, a play item, a playlist, and an info file.

Only one info file is present in a medium such as a disc which records BDAV-adaptive content, for example. The reproducing apparatus can firstly read the info file and display menu information and the like based on a table in the playlist file included in the info. A list such as a playlist corresponding to content recorded on the disc is presented in the displayed menu, and the user can designate a title and reproduce content. In addition, content entity data is stored on the clip AV stream file.

The designation information by the user performed on the menu shown to the user based on the info file causes designation processing of a playlist or reproduction path information (play item) in the playlist. The playlist includes reproduction path information (play item) as reproduction section designating information as described above.

As the reproduction path information (play item), two kinds, namely
a main path (main play item (PlayItem)) and
a sub path (sub play item (SubPlayItem))
are present.

Each of the main path (main play item) and the sub path (sub play item) is individually associated to one certain clip.

The main path (main play item) and the sub path (sub play item) includes designation information of a reproduction start point (IN time) and a reproduction end point (OUT time). The designation information of the reproduction start point (IN time) and the reproduction end point (OUT time) are used as reproduction section designating information of content included in the clip AV stream file associated with a clip in a one-to-one relationship.

As described above, the designation information of a title included in the menu shown to the user based on the info is used as selection information for a playlist or a play item, a reproduction section is determined based on the reproduction start point (IN time) and the reproduction endpoint (OUT time) set in the selected reproduction path information (play item), the clip information file and the clip AV stream file as a clip is selected in accordance with the determined reproduction section, and reproduction is executed. By defining the structure shown in FIG. 4, it is possible to perform non-destructive reproduction order designation in which only an arbitrary part is reproduced without changing the clip AV stream file.

A correlation between the clip information file, for which reproduction start/end points are designated based on the play list, the reproduction path information (play item) included in the play list, and further the reproduction path information (play item), and the clip AV stream file which is associated with the clip information file in a one-to-one relationship and stores reproduction content thereon will be described with reference to FIG. 5.

Figure 5:
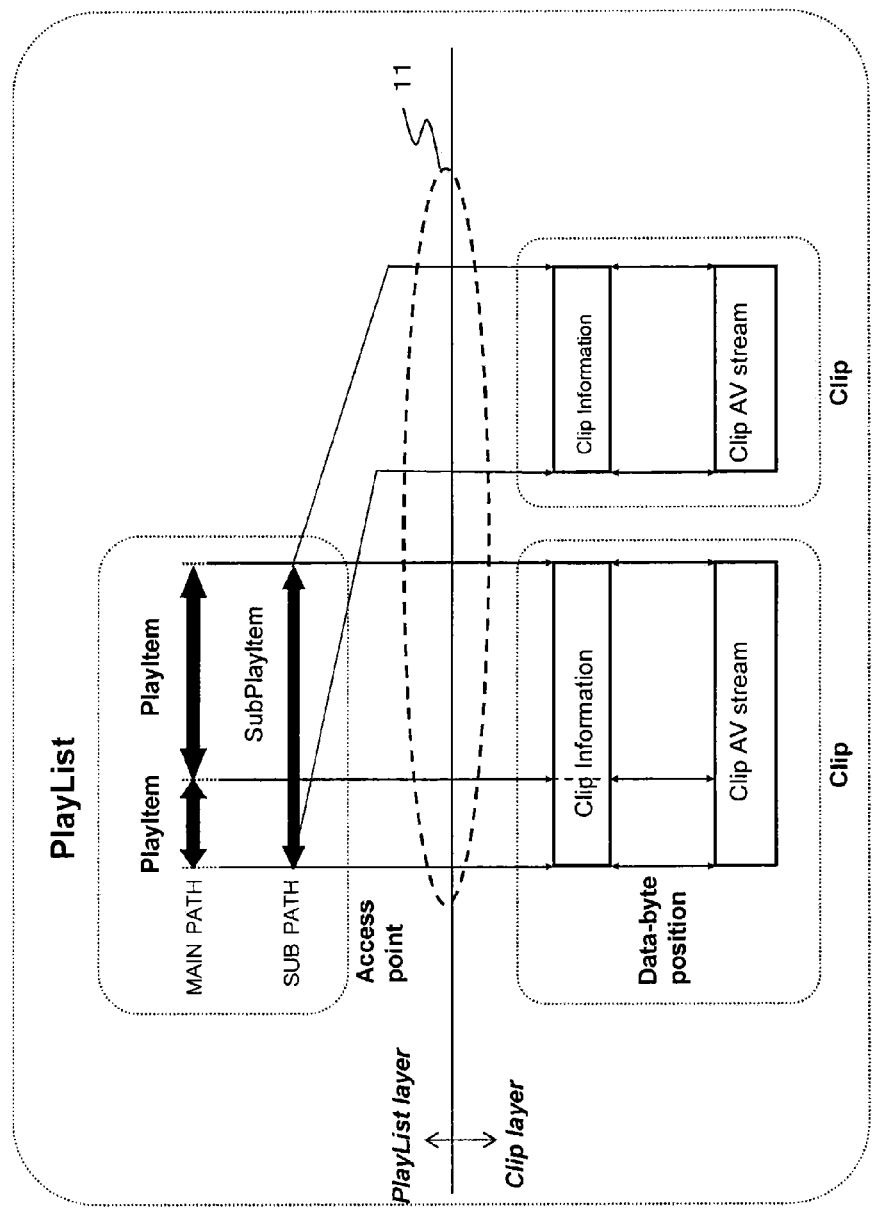
FIG. 5 is a diagram illustrating the correlation between a playlist and reproduction path information (play item) and between a clip information file and a clip AV stream file.

FIG. 5 shows a playlist, reproduction path information (play item) included in the playlist, and further, a clip information file, for which the reproduction start/end points are designated based on the reproduction path information (play item), and a clip information file. In addition, the clip AV stream file (Clip AV stream) and the clip information file (Clip Information) as supplemental information thereof are regarded as one object, and a set of them is referred to as a clip.

As described above,
a main path (main play item (PlayItem)) and
a sub path (sub play item (SubPlayItem))
are included in the playlist. These respectively include designation information on a reproduction start point (IN time) and a reproduction endpoint (OUT time). The arrows 11 directed from the main path (main play item (PlayItem)) and the sub path (sub play item (SubPlayItem)) to the clip information file (Clip Information) shown in FIG. 5 correspond to designation information of the reproduction start point (IN time) and the reproduction end point (OUT time).

The designation information of the reproduction start point (IN time) and the reproduction endpoint (OUT time) is used as the reproduction section designating information of content included in the clip AV stream file associated with the clip information file in a one-to-one relationship.

[3. Concerning Recording Processing of Three-Dimensional Image Information and Reproduction Processing Using Recorded Three-Dimensional Image Information]

Next, description will be given of recording processing of three-dimensional image information and reproduction processing using the recorded three-dimensional image information. For example, in many existing data recording and reproducing standards (formats) such as the aforementioned BDAV standard, an area for recording attribute information relating to a three-dimensional image is not defined. Even if the three-dimensional image is recorded based on such a format, there is a possibility that the three-dimensional image is recorded in the same manner as a two-dimensional image and reproduced as an ordinary two-dimensional image when reproduced. Hereinafter, description will be given of a configuration in which various kinds of attribute information including information on whether or not a recorded image is a three-dimensional image, coding state information of the three-dimensional image, and further control information to be applied to recording and reproducing of the three-dimensional image is recorded in recording the three-dimensional image in a recording medium and such attribute information is referred to in the reproduction to make it possible to correctly reproduce the three-dimensional image, in order to solve the above problem.

According to the configuration of the present invention, three-dimensional image information as attribute information of a three-dimensional image is recorded in each of the hierarchized management information files. The attribute information in units of management data of each file is recorded in each of the management information files. In reproducing content from a medium, it is possible to sequentially read three-dimensional image information from these hierarchized management information files and recognize attributes in units of management data in each of the management information file, and correct decoding and reproduction processing of the three-dimensional image is realized in data units.

In addition, as a medium which has a three-dimensional image recorded therein, various media such as a BD (Blu-ray Disc (registered trademark)) and flash memory can be used. The present invention is not limited to a specific recording medium and can be applied to recording and reproducing processing using various media.

In addition, although the following description will be given of an example of the BDAV standard (format) as a recording and reproducing format in which recording area for information relating to the three-dimensional image is not defined, this is an example, and the present invention is not limited to the BDAV standard and can be applied to other standards.

(3-1. Concerning Recording Processing and Utilizing Processing of Three-Dimensional Image Information Using Management Information File (Database File))

First description will be given of processing of recording and using the three-dimensional image information in the management information file (database file) in recording and reproducing content using various recording media including a disc such as a BD (Blu-ray Disc (registered trademark) and flash memory.

As described above, the content as entity data is stored on and recorded in the AV stream file in recording the content in the medium based on the BDAV standard. Furthermore, the management information file (database file) is recorded as management information of the recorded content. The management information file (database file) includes the following files:

(a) info file [info.bdav];
(b) playlist file; and
(c) clip information file.

The example described below is a processing example used in recording three-dimensional image information in these database files and using the three-dimensional image information for reproduction.

(3-1-a. Example of Recording Three-Dimensional Image Information in Info File)

First, description will be given of an example in which three-dimensional image information is recorded in the info file [info.bdav].

FIG. 6 shows syntax of the info file [info.bdav] defined as a management information file (database file) in the BDAV standard.

In the following description will be given of the syntax of various kinds of management information defined in the BDAV standard with reference to the drawing. The information processing apparatus which executes data recording in a medium performs processing of generating and recording management information configured by a syntax, which will be described below, in the content recording processing. In addition, even when the information processing apparatus executes processing such as editing of content which has already been recorded and changes the recorded content, update of the management information is executed in accordance with the change. The information processing apparatus which executes data reproduction from the medium which records the content therein analyzes a coding stream as reproduction target content based on the syntax, execute decoding processing, and generates reproduction data.

In addition, in the syntax shown in each of the following drawings, a syntax item (Syntax), a bit length (No. of bits), and a mnemonic representing a type and a transmission order are shown from the left side as components.

The info file [info.bdav] shown in FIG. 6 is configured mainly by the following three objects as shown in the drawing:

UI information [UIAppInfoBDAV( )] 101;
play list information [TableOfPlayLists( )] 102; and
Maker private data area [MakersPrivateData( )] 103.

The info file [info.bdav] is configured by these objects.

The info file [info.bdav] includes playlist designation information.

Among the above information, the UI information [UIAppInfoBDAV( )] 101 is an area in which information relating to display of menu information including content titles, for example, is recorded therein.

The playlist information [TableOfPlayLists( )] 102 is an area in which playlist information for reproducing content corresponding to a title is recorded therein.

The maker private data area [MakersPrivateData( )] 103 is an area in which a maker of providing the information processing apparatus such as a reproduction device can freely record information therein. The maker private data area is set as an area in which a maker of a recording and a reproducing apparatus, for example, can freely record information for a special application of each company, which is executed in the recording and reproducing apparatus. In addition, the [MakersPrivateData( )] 103 is set such that each maker can individually insert private data.

The syntax of the maker private data area 103 will be shown in FIG. 7.

As shown in FIG. 7, the maker private data area [MakersPrivateData( )] 103 includes data recording areas, namely
a maker ID [maker_ID] recording area 111,
a maker model code [maker_model_code] recording area 112, and
a data block [data_block] recording area 113.

First, description will be given of a general use state of these data recording areas.

The maker ID [maker_ID] recording area 111 is an identification information recording area of a maker, in which maker private data is recorded. For example, when a recording and reproducing apparatus of the A Company executes content recording and records a parameter to be applied to an application which is unique to the apparatus of A company, a processing of recording an ID set by A Company and recording the parameter in an actual data recording area for the maker private data is performed.

The maker model code [maker_model_code] recording area 112 is a code such as product identification information of an apparatus in which the maker private data is recorded.

The data block [data_block] recording area 113 is the actual data recording area of the maker private data.

In this embodiment, data recording areas, namely the maker ID [maker_ID] recording area 111,
the maker model code [maker_model_code] recording area 112, and
the data block [data_block] recording area 113
shown in FIG. 7 are used to record three-dimensional image information (multiview_video_info).

In addition various kinds of information unique to a maker are recorded in the data block [data_block] recording area 113. As a part thereof, the three-dimensional image information (multiview_video_info) is recorded.

In accordance with each of recorded information items, a set of three recording areas, namely the maker ID [maker_ID], the maker model code [maker_model_code], and the data block [data_block] can be set.

Accordingly, when attribute information and control information relating to a three-dimensional image are recorded in the data block [data_block] recording area 113, index information on whether or not information recorded in the data block [data_block] recording area 113 is three-dimensional image information (multiview_video_info) is firstly recorded in the fields of
the maker ID [maker_ID] recording area 111 and
the maker model code [maker_model_code] recording area 112.

One specific example of a data recording state will be shown in FIG. 8.

In the maker ID [maker_ID] recording area 111, identification information on whether or not maker private data recorded in the data block is three-dimensional image information is recorded.

As shown in FIG. 8, for example, when ID information [0x2000] corresponding to predefined three-dimensional image information (multiview_video_info) is recorded in the maker ID [maker_ID] recording area 111, this means that information recorded in the subsequent data block is three-dimensional image information (multiview_video_info).

In addition, in the maker model code [maker_model_code] recording area 112, version information of the three-dimensional image information recorded in the data block is recorded. In the example shown in FIG. 8, [0x0100] is version information of the three-dimensional image information.

A specific example of the three-dimensional image information (multiview_video_info) recorded in the data block [data_block] recording area 113 shown in FIG. 7 will be shown in FIG. 9.

In the three-dimensional image information (multiview_video-info), flag information [Index_multiview-video-flag] 115 is recorded as shown in FIG. 9.

The flag information 115 is a taflag information which sets information on whether or not a three-dimensional image is included in the set content (management target content by the info file) under the BDAV directory of the content recorded in the medium.

A specific example of the flag information 115 will be shown in FIG. 10.

When a value of the flag=0, only 2D content is included under the management target directory, and no 3D content is included.

When a value of the flag=1, there is a possibility that 3D content is included under the management target directory.

As described above, information of one of the flag=0/1 is set, and in the case of 0, only 2D content is included under the management target directory, and no 3D content is included. In the case of 1, there is a possibility that 3D content is included under the management target directory.

Such information can be determined.

Since such flag information is included in the info file, the reproducing apparatus can show the user information on whether or not a three-dimensional image is included in content corresponding to each title based on the flag information in performing menu display including content titles stored on the medium using the info file, for example.

For example, the following menu display can be performed:
Title A: A three-dimensional image is included;
Title B: This is a two-dimensional image; and
Title C: A three-dimensional image is included.

In addition, the apparatus which records content sets the flag=1 when a three-dimensional image is included in the recorded content, and generates and records an info file for which the flag=0 is set when a three-dimensional image is not included in the recorded content. If editing or deletion is performed later on the recorded data, update processing of setting the value of the flag to zero is executed when the clip is checked and the 3D content is not present.

(3-1-b. Example of Recording Three-Dimensional Image Information in Playlist File)

Next, description will be given of an example in which three-dimensional image information is recorded in the playlist file. The aforementioned description was given of the example in which the three-dimensional image information was recorded in the maker private data area in the info file [info.bdav]).

The playlist file is a file which stores a playlist to be selected corresponding to a title selected from the title display menu using the info file [info.bdav] as described above with reference to FIGS. 4 and 5. As described above with reference to FIG. 5, the reproduction path information (play item) including reproduction section designating information with the reproduction start point (IN point) and the reproduction endpoint (OUT point) for the clip is stored on the playlist.

A plurality of playlist files respectively corresponding to a plurality of titles are present in the medium. For each of these playlist files, the maker private data area is set in the same manner as in the info file [info.bdav]. That is, an area in which a maker providing the information processing apparatus such as a recording and reproducing device can freely record information is set.

This example is an example in which three-dimensional image information (multiview_video_info) is recorded in the maker private data area in the playlist file.

In addition, in the same manner as in the info file shown in FIG. 7, the data recording areas, namely
the maker ID [maker_ID] recording area,
the maker mode code [maker_model_code] recording area,
and the data block [data_block] recording area
are set even in the maker private data area in the playlist file.

when the three-dimensional image information (multiview_video_info) is recorded in the maker private data area in the playlist file, identification information on whether or not the data recorded in the data block is three-dimensional image information is recorded in the maker ID recording area in the playlist file. Similarly, version information of the three-dimensional image information recorded in the data block is recorded in the maker model code [maker_model_code] recording area in the playlist file. These have the same recording configurations as those in the case of the info file described above with reference to FIG. 8.

Next, description will be given of a specific example of the three-dimensional image information (multiview_video_info) recorded in the data block [data_block] recording area in the maker private data area in the playlist file with reference to FIG. 11.

As shown in FIG. 11, the following information is recorded in the data block [data_block] recording area in the maker private data area in the playlist file:
a three-dimensional image flag [PlayList_multiview_video_flag] 121;
a three-dimensional image configuration information [PlayList_multiview_video_configuration] 122;
a frame-0 image identification flag [PlayList_frame0_is_Left_flag] 123;
a base image identification flag [PlayList_base_view_is_Left_flag] 124;
a main path image identification flag [PlayList_MainPath_is_Left_flag] 125;
a coding state identification flag [PlayList_use_entropy_coding_mode_flag] 126; and
inter-image reference identification flag [PlayList_use_interview_prediction_flag] 127.

The above information is the three-dimensional image information recorded in each playlist file.

These are management information relating to reproduction target content designated by each playlist file and are information set corresponding to content of a reproduction designating section defined by the reproduction path information (playlist item) included in the playlist file.

Accordingly different information is recorded in the playlist file with different reproduction target content.

The apparatus which performs content recording determines whether or not a three-dimensional image is included in the recorded content and records three-dimensional image information shown in FIG. 11 in the data block [data_block] recording area in the maker private data area in the playlist file in accordance with the determination information.

The apparatus which executes content reproduction can correctly execute three-dimensional image reproduction by applying the information recorded in the playlist file.

A specific example of each information item recorded in the data block [data_block] recording area in the maker private data area shown in FIG. 11 will be described with reference to FIG. 12 and the subsequent drawings.

(Three-Dimensional Image Flag [PlayList_multiview_video_flag] 121)

First, description will be given of a specific example of a three-dimensional image flag 121 with reference to FIG. 12.

The three-dimensional image flag 121 is three-dimensional image discrimination data which represents whether or not there is a possibility that a three-dimensional image is included in the management target data in the playlist As shown in FIG. 12,
when the value of the three-dimensional image flag=0, only 2D content is included and no 3D content is included in the reproduction target content in the playlist, and
when the value of the three-dimensional image flag=1, there is a possibility that 3D content is included in the reproduction target content in the playlist.

As described above, one of the information items of the flag=0/1 is recorded.

In addition, although the description is given of this example in which three-dimensional image information is not included in units of reproduction paths (play items) included in the playlist, three-dimensional image information set for each program sequence (program_sequence) of the clip information file, which will be described later, can be used as information in units of play items which is a lower class of the playlist.

In addition, there is a possibility that a 2D image and a 3D image are present at the same time in units of play items in the recorded content corresponding to one playlist. In such a case, the flag setting is made as follows.

When the value of the three-dimensional image flag=1, there is a possibility that 3D content is included in the reproduction target content in the playlist.

This setting is made.

The apparatus which executes content recording determines whether or not a three-dimensional image is included in the recorded content and records the above flag in accordance with the determination information.

The apparatus which executes content reproduction can refer to the value of the flag and identify whether or not the three-dimensional image is included in the content to be reproduced using the playlist.

(Three-dimensional Image Configuration Information [PlayList_multiview_video_configuration] 122)

Next, description will be given of a specific example of three-dimensional image configuration information 122 with reference to FIG. 13.

The three-dimensional image configuration information 122 is set as an area for recording coding state information of a three-dimensional image as content reproduced by the playlist.

Specifically, the following setting as shown in FIG. 13 is made.
the value=3: side by side scheme
the value=4: top and bottom scheme
the value=5: frame sequential scheme
the value=30: MVC coding two-elementary stream/one-system stream (one clip AV stream)
the value=31: MVC coding two-elementary stream/two-system stream (two-clip AV stream)
the value=32: MVC coding one-elementary stream/one-system stream (one-clip AV stream)
the value=40: independent two-elementary stream/one-system stream (one-clip AV stream) (not MVC coding)
the value=41: independent two-elementary stream/two-system stream (two-clip AV stream) (not MVC coding)

The above coding configuration information is recorded.

In addition, when it is not possible to know a type of 3D content in the playlist, or when a plurality of types of 3D content are present in the playlist, 20 is set (no information).

The side by side scheme when the value=3 corresponds to a coding scheme shown in FIG. 1(1).

The top and bottom scheme when the value=4 corresponds to a coding scheme shown in FIG. 1(2).

The frame sequential scheme when the value=5 corresponds to a coding scheme shown in FIG. 1(3).

Figure 2:
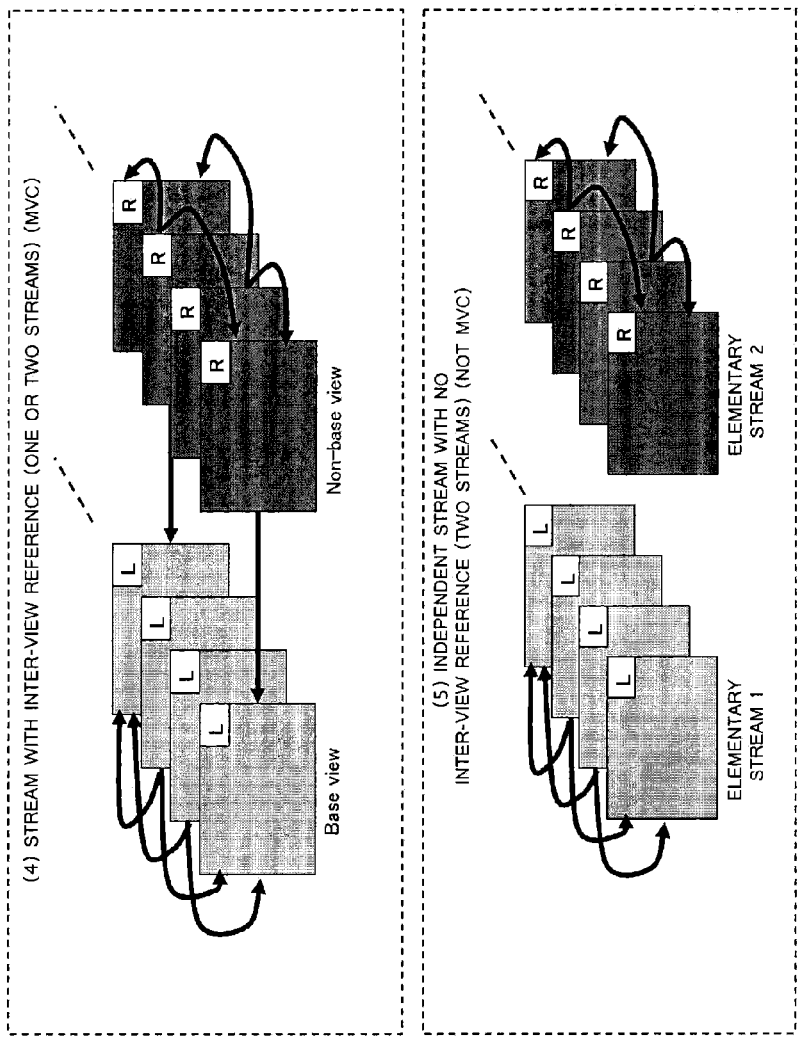
FIG. 2 is a diagram illustrating a coding scheme of a three-dimensional image.

The MVC coding schemes when the value is from 30 to 32 correspond to a coding scheme shown in FIG. 2(4).

This case is classified into a case where the number of the elementary streams is one or two and a case where the number of system streams is one or two.

The coding schemes when the value is from 40 to 41 correspond to a coding scheme shown in FIG. 2(5).

This case is classified into a case where the number of elementary streams is two and a case where the number of system streams is one or two.

The apparatus which executes content recording records the above value in accordance with coding state information when a three-dimensional image is included in the recorded content.

The apparatus which executes content reproduction can refer to the above value, identify the coding state of the content to be reproduced using the playlist, and execute decoding processing corresponding to the identification information.

(Frame Zero Image Identification Flag [PlayList_frame0_is_Left_flag] 123)

Next, a specific example of a frame zero image identification flag 123 will be described with reference to FIG. 14.

The frame zero image identification flag 123 is information recorded when a coding scheme of a three-dimensional image is a frame sequential scheme (see FIG. 1(3)) and used for reproduction. That is, the frame zero image identification flag 123 is used when the three-dimensional image configuration information=5 as described above with reference to FIG. 13.

In the case of the frame sequential scheme as shown in FIG. 1(3), the image for the left eye (L image) and the image for the right eye (R image) are set as alternate frames.

For example, any one of the following combinations, that is,
the frame zero is the image for the left eye (L image), and the frame one is the image for the right eye (R image), or
the frame zero is the image for the right eye (R image) and the frame one is the image for the left eye (L image)
is used.

In the reproduction, the L image and the R image are alternately displayed on a display apparatus, for example, and opening and closing of a shutter of shutter type glasses that the user wears, for example, are executed in accordance with the display.

By such processing, the L image is observed only by the left eye of the user, the R image is observed only by the right eye, and the user can get a correct sense of perspective.

However, there is a possibility that display processing is performed in completely opposite setting such that the right eye of the shutter type glasses is opened at timing when the L image is displayed on a display unit and the left eye of the shutter type glasses is opened at timing when the R image is displayed, if mix-up of the L image and the R image occurs. If such display control is executed, it is not possible to observe a three-dimensional image with a correct spatial effect.

The information for preventing such a circumstance is the frame zero image identification flag 123 shown in FIG. 14. That is, the frame zero image identification flag 123 is an area for recording information representing one of whether or not the frame zero is the image for the left eye (L image), and whether or not the frame zero is the image for the right eye (R image).

Specifically, the frame zero image identification flag 123 records information of:
the value=2: the frame zero is the image for the right eye (R image); and
the value=3: the frame zero is the image for the left eye (L image)
as shown in FIG. 14, for example.

In addition, when the correlation between the frame zero and L/R are mixed up in the playlist, or when information on the correlation cannot be obtained, zero (no information) is set.

When a three-dimensional image is included in the recorded content, and the coding state thereof is the frame sequential scheme, the apparatus which executes the content recording records the above value in accordance with the frame information.

The apparatus which executes the content reproduction can refer to the above value, correctly determines whether the frame zero is the L image or the R image, and perform correct reproduction display of the LR images in performing the decoding processing of content to be reproduced using the playlist.
(base image identification flag [PlayList_base_view_is_Left_flag] 124)

Next, description will be given of a specific example of a base image identification flag 124 with reference to FIG. 15.

The base image identification flag 124 is information recorded when a coding scheme of a three-dimensional image is the MVC coding scheme (see FIG. 2(4)) and used for reproduction. That is, the base image identification flag 124 is used when the three-dimensional image configuration information=30 to 33 described above with reference to FIG. 13.

In the MVC coding scheme described above with reference to FIG. 2(4), reference coding processing is performed between the L image and the R image in some cases. When the coding based on the inter-view reference is performed, one of LR is regarded as a base view (base image), and the decoding of the other image is performed with reference to the base view.

The base image identification flag 124 is a value representing whether the base view is the L image or the R image. Specifically, the base image identification flag 124 records information of
value=2: the base view is the image for the right eye (R image),
value=3: the base view is the image for the left eye (L image)
as shown in FIG. 15, for example.

In addition, when the correlation between the base view and L/R are mixed up in the playlist, or when information on the correlation cannot be obtained, zero (no information) is set.

When a three-dimensional image is included in the recorded content, and the coding state thereof is the MVC coding scheme (see FIG. 2(4)), the apparatus which executes content recording records the above value in accordance with the base view information.

The apparatus which executes content reproduction can refer to the above value, determine which one of LR the base view is, and correctly decode and display the LR image in the decoding processing of content reproduced using the playlist.
(main path image identification flag [PlayList_MainPath_is_Left_flag] 125)

Next, description will be given of a specific example of a main path image identification flag 125 with reference to FIG. 16.

The main path image identification flag 125 records a flag used in the case of the coding scheme described above with reference to FIG. 2(5), namely the coding scheme of [independent stream (two stream) with no inter-view reference (not MVC)] and the independent two-elementary stream/two-system stream (two-clip AV stream).

Specifically, the main path image identification flag 125 is used in the case of the setting of three-dimensional image configuration information=41: independent two-elementary stream/two-system stream (two-clip AV stream) described above with reference to FIG. 13.

In the main path image identification flag 125, information representing which one of the L image and the R image the following two paths set in the playlist, namely,
the main path (main play item) and
the sub path (sub play item)
respectively correspond to is recorded.

Specifically, the information of
the value=2: the main path is the image for the right eye (R image) or
the value=3: the main path is the image for the left eye (L image)
is recorded as shown in FIG. 16, for example.

In addition, when the correlation between the main path and L/R are mixed up in the playlist, or when information on the correlation cannot be obtained, zero (no information) is set.

When a three-dimensional image is included in the recorded content, and the coding state is the three-dimensional image configuration information=41: independent two-elementary stream/two-system stream (two-clip AV stream) described above with reference to FIG. 13, the apparatus which executes content recording records the above value in accordance with the setting of the playlist to be created or updated.

The apparatus which executes content reproduction can refer to the above value, correctly determine the reproduction path of which one of the LR images each of the main path and the sub path is, and correctly decode and display the LR image.

Description will be given of use states of the main path and the sub path with reference to FIG. 17.

Figure 17:
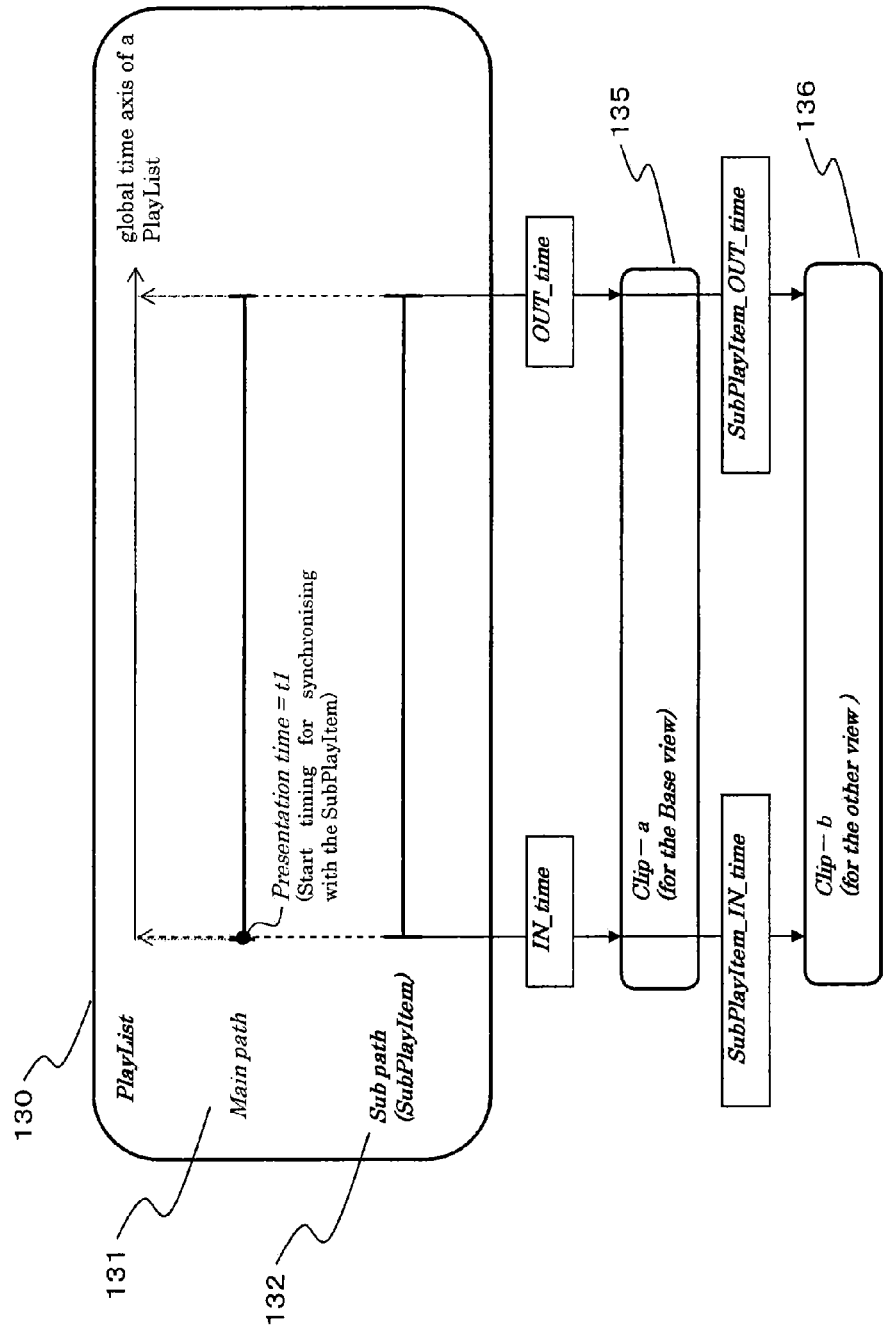
FIG. 17 is a diagram illustrating use states of a main path and a sub path.

FIG. 17 shows one playlist 130. The playlist 130 includes a main path (main play item) 131 and a sub path (sub play item) 132.

The main path (main play item) 131 holds a reproduction start point (IN_time) and a reproduction end point (OUT_time) for a clip a, 135, and reproduces an AV stream associated with the clip a135.

The sub path (sub play item) 132 holds a reproduction start point (IN_time) and a reproduction end point (OUT_time) for a clip b, 136, and reproduces an AV stream associated with the clip b136.

In the case of such setting, as the pattern in which the main path and the sub path correspond to one of the LR images, there are the two patterns below.
(a) Pattern 1
a clip designated by the main path is an L image reproduction clip, and
a clip designated by the sub path is an R image reproduction clip
(b) Pattern 2
the clip designated by the main path is the R image reproduction clip, and
the clip designated by the sub path is the L image reproduction clip Above Pattern 1 or Pattern 2 can be considered.

With such setting, it is possible to execute three-dimensional image reproduction of the L image and the R image using the main path (main play item) 131 and the sub path (sub play item) 132 in one playlist.

However, the reproducing apparatus cannot correctly execute three-dimensional image display if which one of the LR images each of the main path and the sub path corresponds to. The main path image identification flag 125 shown in FIG. 16 is a flag representing whether the main path corresponds to the L image or the R image, and the reproducing apparatus can refer to such information and correctly decode and display the LR image.
(coding state identification flag [PlayList_use_entropy_coding_mode_flag] 126)

Next, description will be given of a specific example of a coding state identification flag 126 with reference to FIG. 18.

The coding state identification flag 126 records a flag used in the case of the coding scheme described above with reference to FIG. 2(4), namely, the coding scheme of [stream with inter-view reference (MVC)].

Specifically, the coding state identification flag 126 is used in the case of the setting of three-dimensional image configuration information=30 to 32 described above with reference to FIG. 13.

The coding state identification flag 126 is an identification flag representing whether or not the coding processing has been executed using an entropy coding mode as the coding processing.

In addition, the coding processing using the entropy coding mode specifically means coding processing using CABAC (Context-based Adaptive Binary Arithmetic Coding), for example.

The coding processing without using the entropy coding mode specifically means coding processing using CAVLC (Context-based Adaptive Variable Length Coding), for example.

Specifically, information of
the value=1: the entropy coding mode is not used, or
the value=2: there is a possibility that the entropy coding mode is being used
is recorded as shown in FIG. 18, for example.

In addition, when information on a video stream to be reproduced from the playlist cannot be obtained, 0 (no information) is set.

When a three-dimensional image is included in the recorded content, and the coding state thereof is the MVC coding scheme (see FIG. 2(4)), the apparatus which executes content recording records the above value in accordance with whether or not the entropy coding mode is applied to the coding processing.

The apparatus which executes content reproduction can refer to the above value, know the coding state, and correctly decode and display the LR image in performing the decoding processing of the content reproduced using the playlist.

For example, the reproducing apparatus is an apparatus which cannot execute decoding of the CAVLC coding in the entropy coding mode in some cases. In such a case, processing of suspending the decoding and reproducing processing of the three-dimensional image based on the setting information of the coding state identification flag 126 and reproducing a two-dimensional image by reproducing only the L image or only the R image can be also executed. Since the reproducing apparatus cannot identify whether or not the coding has been performed in a coding state that the reproducing apparatus itself can reproduce if the flag is not present, the reproducing apparatus starts decoding processing, and as a result, a processing error occurs.
(inter-image reference identification flag [PlayList_use_inter-view_prediction_flag] 127)

Next, description will be given of an inter-image reference identification flag [PlayList_use_inter-view_prediction_flag] 127 will be described with reference to FIG. 19.

The inter-image reference identification flag 127 also records a flag used in the case of the coding scheme described above with reference to FIG. 2(4), namely the coding scheme of [stream with inter-view reference (MVC)].

Specifically, the inter-image reference identification flag 127 is used in the case of the setting of the three-dimensional image configuration information=30 to 32 described above with reference to FIG. 13.

The inter-image reference identification flag 127 is information representing whether or not coding during which inter-view reference is executed is performed in the case of the setting of the three-dimensional image configuration information=30 to 32 described above with reference to FIG. 13. In practice, there is also a case in which the reference processing between the L image and the R image is not executed even in the coding processing based on the setting of the coding scheme described above with reference to FIG. 2(4), namely the setting of [stream with inter-view reference (MVC)].

Specifically, as coded data used as reference content for one play list, there are cases in which
only coded data with no reference between the L image and the R image is included, or
coded data with reference between the L image and the R image is included.

The flag which makes it possible to identify the two kinds of data is set as the inter-image reference identification flag 127.

Specifically, the information of
the value=1: no inter-view reference or
the value=2: there is a possibility that inter-view reference is included
is set as shown in FIG. 19, for example.

In addition, when information on a video stream to be reproduced from the playlist cannot be obtained, 0 (no information) is set.

When a three-dimensional image is included in the recorded content, and the coding state thereof is the MVC coding scheme (see FIG. 2(4)), the apparatus which executes the content recording records the above value in accordance with whether or not the inter-view reference is executed in the coding processing.

The apparatus which executes content reproduction can refer to the above value, know the coding state, and correctly decode and display the LR images in performing the decoding processing of the content reproduced using the playlist.

(3-1-c. Example of Recording Three-Dimensional Image Information in Reproduction Path Information (Sub Play Item Information) in Playlist File)

Next, description will be given of an example of recording three-dimensional image information in reproduction path information (sub play item information) in the playlist file.

FIG. 20 is a diagram showing syntax of the playlist file. The playlist is a file which stores therein a playlist selected corresponding to a title selected from the title display menu using the info file as described above with reference to FIGS. 4 and 5. As described above with reference to FIG. 5, the reproduction path information (play item) including the reproduction section designating information with the reproduction start point (IN point) and the reproduction end point (OUT point) for the clip is stored in the playlist.

As the reproduction path information (play item), the two kinds, namely
the main path (main play item (PlayItem)) and
the sub path (sub play item (SubPlayItem))
are present.

Each of these main path (main play item) and the sub path (sub play item) is independently associated with one certain clip.

When the coding state of the three-dimensional image is the three-dimensional image configuration information=41: independent two-elementary stream/two-system stream (two-clip AV steam) described above with reference to FIG. 13,
each of the main path (play item) and the sub path (sub play item) included in the playlist is set as a reproduction path of the L image or the R image, as described above with reference to FIGS. 16 and 17.

That is, in the setting of Pattern 1 or Pattern 2, namely
(a) Pattern 1
the clip designated by the main path is the L image reproduction clip, and
the clip designated by the sub path is the R image reproduction clip, or
(b) Pattern 2
the clip designated by the main path is the R image reproduction clip, and
the clip designated by the sub path is the L image reproduction clip,
the image is recorded.

Which setting the image has been recorded is recorded in the main path image identification flag [PlayList_Main-Path_is_Left_flag] 125 as described above with reference to FIGS. 13 and 16, it is possible to identify the setting with reference to the flag for the reproduction.

However, when an image is captured by a video camera, for example, and recorded in a medium, a combination of a main path (play item) and a sub path (sub play item) is not always the combination of an L image and an R image configuring a three-dimensional image.

For example, setting is made in some cases such that the main path (play item) is a path for reproducing ordinary two-dimensional image data and
the sub path (sub play item) is a reproduction path for postrecorded audio data.

In addition, as a use state of the main path and the sub path, setting of combinations of reproduction paths for different images such as
image reproduction paths for a wide image and a telephoto image,
image reproduction paths for a full view image and a partially enlarged image, and
image reproduction paths for two images with different focusing positions
can be made.

While the main path (play item) is used as main reproduction path information for image data, there are various use states of the sub path (sub play item). Accordingly, it is necessary to perform reproduction after determining the use state of the sub path for the reproduction.

As information for this, three-dimensional image information is recorded in reproduction path information (sub play item information) in the playlist file.

In the syntax of the playlist file shown in FIG. 20, an area for recording unique information of the main path (play item) and the sub path (sub play item) included in the play list is set.

The information recording areas, namely a main path (play item) information recording area 141 and a sub path (sub play item) information recording area 142 are set.

The detailed syntax for the recorded data in the sub path (sub play item) information recording area 142 will be shown in FIG. 21. As shown in FIG. 21,
a sub path (sub play item) type information recording area 145
is set in the sub path (sub play item) information recording area 142.

In this processing example, a sub path use type identification value for identifying whether or not the sub path (sub play item) is a sub path (sub play item) for reproducing any one of LR images configuring a three-dimensional image is set in the sub path (sub play item) type information recording area 145. For example, a value as shown in FIG. 22 is set.

In the example shown in FIG. 22, the setting of the sub path use type identification value is made as follows.
the value=1: reproduction path for an audio stream
the value=2: image reproduction path of one of configuring images (LR images) of a three-dimensional image
The values as described above are set.

When a three-dimensional image is included in the recorded content, and for the three-dimensional image, the main path (play item) and the sub path (sub play item) in one play list are respectively used as reproduction paths for the LR images, the above value (2) is recorded.

The apparatus which executes content reproduction can refer to the above value, confirm that the sub path is a reproduction path for one of the LR images configuring a three-dimensional image, and correctly decode and display the LR images.

In addition, based on the BDAV standard, only one sub path (sub play item) can be added to a main path (play item) in one playlist. The sub path (sub play item) can be set for entire or a part of the main path (play item) on the time axis. On this occasion, the sub path (sub play item) may be set so as to cross over borders of a plurality of play items in the main path.

(3-1-d. Example of Recording Three-Dimensional Image Information in Clip Information File)

Next, description will be given of an example of recoding three-dimensional image information in the clip information file.

As described above with reference to FIG. 3 and the like, the clip information file [xxxxx.clpi] recorded in the clip information directory [CLIPINF] is set corresponding to the AV stream file [xxxxx.m2ts] recorded in the stream directory [STREAM] in a one-to-one relationship. The clip information file is a file in which information relating a stream necessary for reproducing an actual stream is described.

The above description was given of an example in which three-dimensional image was recorded in the info file and the maker private data area in the playlist file.

A maker private data area is set even in the clip information file in the same manner as in the playlist file and the info file. That is, an area in which a maker providing an information processing apparatus such as a recording and reproducing device can freely record information is set.

This example is an example in which three-dimensional image information (multiview_video_info) is recorded in the maker private data area in the clip information file.

The syntax of the clip information file will be shown in FIG. 23. The clip information file is configured by six objects as shown in FIG. 23. That is, ClipInfo( ) 201,
SequenceInfo( ) 202,
ProgramInfo( ) 203,
CPI( ) 204,
ClipMark( ) 205, and
MakersPrivateData( ) 206 configure the clip information file.

ClipInfo( ) 201 records attribute information of the AV stream file corresponding to the clip information file.

Description will be given of SequenceInfo( ) 202.

A time section, which does not include a discontinuous point (a discontinuous point of a system time base0 of STC (System Time Clock (reference time)), in an MPEG-2 transport stream is referred to as STC_sequence, and STC_sequence is specified based on a value of stc_id in the Clip. STCs which have the same value never appear in the same STC_sequence. Accordingly, same PTS (Presentation Time Stamp (time information for synchronized reproduction)) values also never appear in the same STC_sequence. When the AV stream includes N (N>0) STC discontinuous points, the system time base of the Clip is divided into (N+1) STC_sequences.

SequenceInfo records an address of a position where discontinuation of STC (discontinuation of the system time base) occurs.

Figure 24:
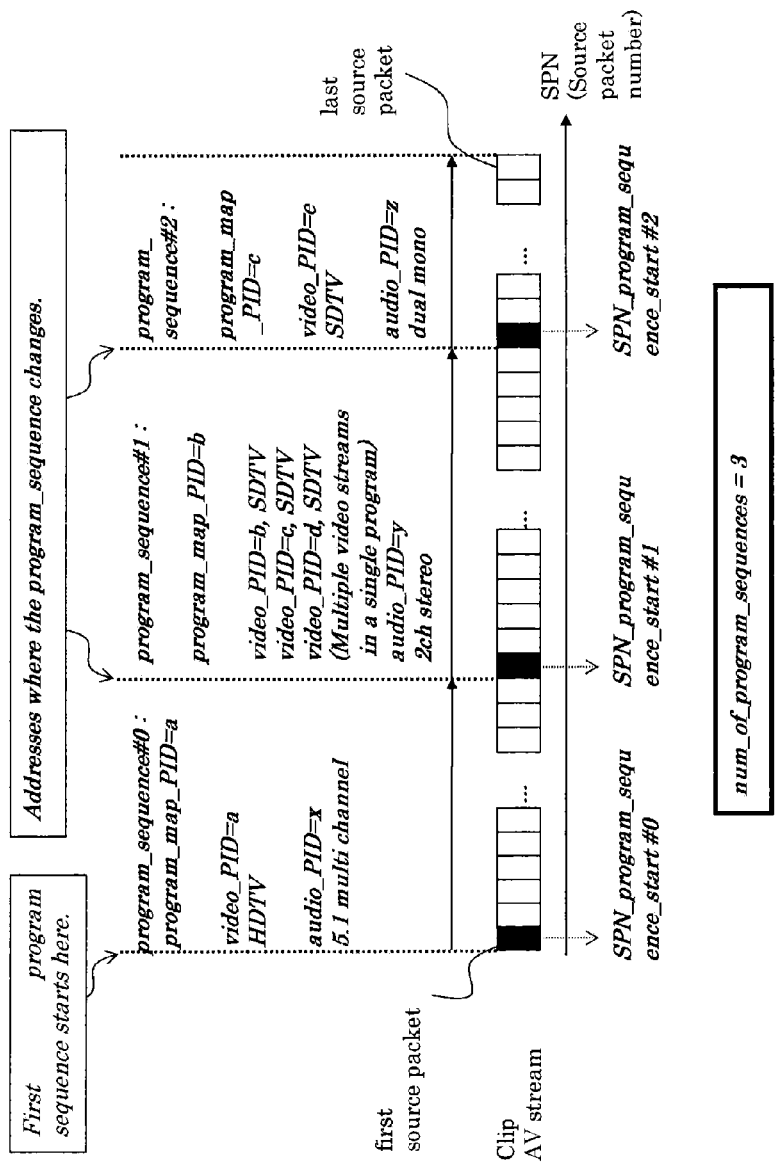
FIG. 24 is a diagram illustrating ProgramInfo in the clip information file and a program sequence (program_sequence).

ProgramInfo( ) 203 will be described. The description will be given with reference to FIG. 24. A reproduction section or a time section which is reproduced by the clip information file and is a reproduction section which has the following features is referred to as a program sequence (program_sequence).

A value of PCR_PID (Program Clock Reference Packet ID) does not change.

A number of video elementary streams does not change.

A value of PID for each video stream and coding information defined by VideoCodingInfo thereof do not change.

A number of audio elementary streams does not change.

A value of PID for each audio stream and coding information defined by AudioCodingInfo do not change.

The program sequence (program_sequence) has only one system time base at the same moment and has only one PMT (Program Map Table) at the same moment.

The transport stream (TS) configuring the MPEG data includes a plurality of programs, and a plurality of table information items representing relationships between the program included in the stream and components of the programs such as videos and audio streams configuring the programs are defined. The table information is called PSI (Program Specific Information), and a plurality of tables such as PAT (Program Association Table) and PMT (Program Map Table) are included. PID and the like of the PMT corresponding to a number of a program is described in the PAT, and videos, audio, and additional data included in the corresponding program, and the PID of the PCR are described in the PMT. With reference to the PAT and the PMT, it is possible to extract a TS packet configuring a target program among the streams.

ProgramInfo( ) records an address of a position where the program sequence (program_sequence) starts. SPN_prpogram_seqnence_start represents the address. SPN is a source packet number.

In addition, a border of the program sequence (program_sequence) and a border of STC_sequence do not always coincide with each other. In addition, although it is necessary that the reproduction start point (IN_time) and the reproduction end point (OUT_time) in the play item (PlayItem) are on the same STC_sequence, such restriction is not provided for the program sequence (program_sequence). That is, there is a case in which a reproduction start point (IN_time) and a reproduction end point (OUT_time) in a certain play item are present on different program sequences (program_sequences), in general.

FIG. 25 is a diagram showing syntax of the ProgramInfo.

num_of_program_sequences represents a number of the program sequences (program_sequences) in the clip information file.

SPN_program_sequence_start [i] is a relative address of a position where the program sequence starts on the AV stream file.

program_map_PID [i] shows an PID of an effective PMT in the program sequence (program_sequence).

num_of_streams_in_ps[i] represents a number of the streams which are present in the program sequence (program_sequence).

num_of_groups [i] represents a number of combinations of streams when the program sequence (program_sequence) is reproduced.

Next, description will be given of CPI (Characteristic Point Information) 204 in the syntax shown in FIG. 23. FIG. 26 is a diagram showing syntax of the CPI.

The CPI records data for associating time information in the AV stream and the address in the file. Specifically, the CPI records an entry point map (EP map (EP_map)) 210.

Figure 27:
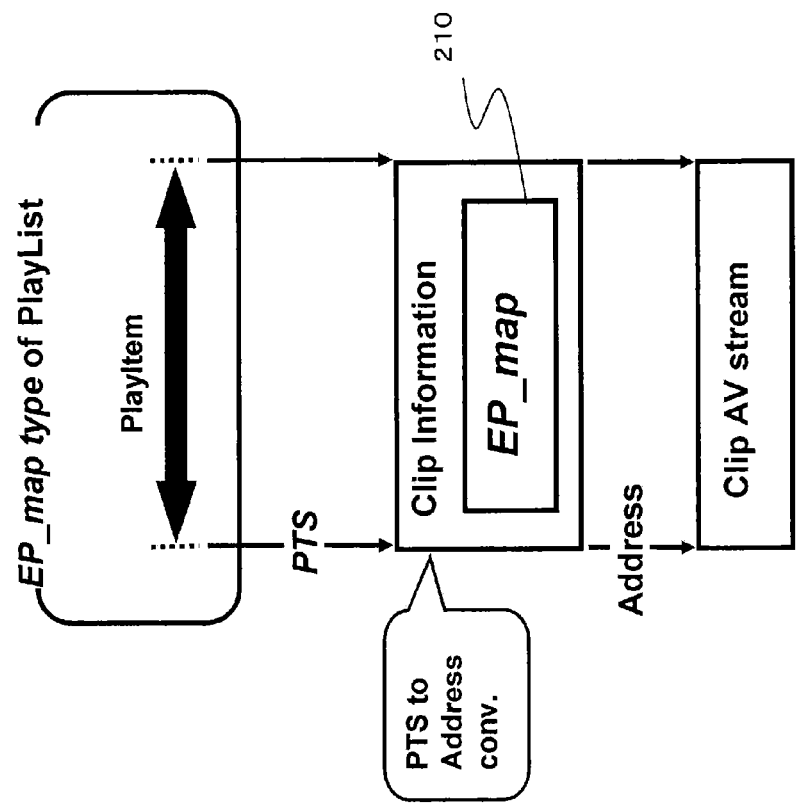
FIG. 27 is a diagram illustrating an EP map recorded in the CPI in the clip information file.
Figure 28:
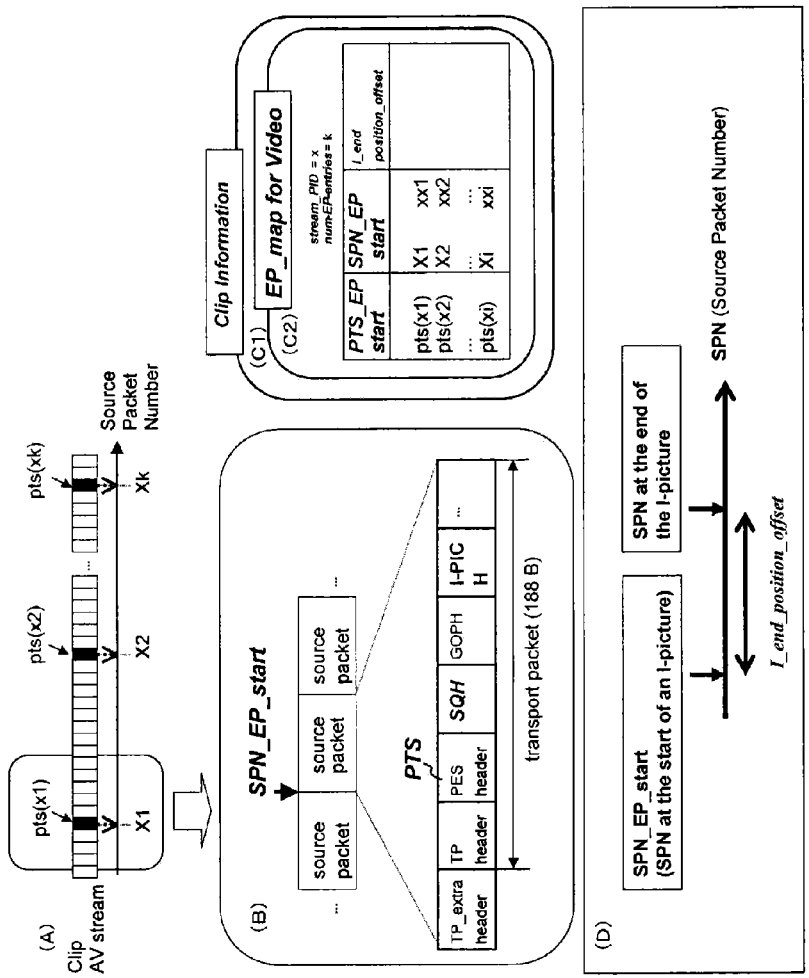
FIG. 28 is a diagram illustrating the EP map recorded in the CPI in the clip information file.

Description will be given of the EP map 210 with reference to FIGS. 27 and 28. As shown in FIG. 27, the EP map (EP_map) 210 is data included in the clip information file. The EP map includes detection information of an I picture position as reference data of the MPEG data, which is a point (entry point) at which random access can be started, for example. The detection processing of the I picture position will be described with reference to FIG. 28. FIG. 28(A) shows a clip AV stream, and each rectangular represents a 192-byte source packet. In each source packet, a time stamp is set, and reproduction processing time is defined.

FIG. 28(B) shows a detailed configuration of a source packet No. (X1). One source packet is configured by a TP_extra header and a transport packet, and the transport packet is configured by various kinds of header information and data from I-PICH as entity of the MPEG data.

In the clip information file shown in FIG. 28(C), the EP map is included as described above. In the EP map, data of [PTS_EP_start], [SPN_EP_start], and [I_end_position_offset] is included as shown in the drawing. The meaning of the data is as follows.

PTS_EP_start: a time stamp (presentation time stamp) corresponding to a source packet including a sequence header
SPN_EP_start: a head address of the source packet including the sequence header
I_end_position_offset: offset of a source packet including an end of an I picture from the source packet including the sequence header These data relationships will be shown in FIG. 28(D).

That is, a configuration of data included in the source packet is defined as shown in FIG. 28(B), and by obtaining the data of [PTS_EP_start], [SPN_EP_start], and [I_end_position_offset] shown in FIG. 28(C) from the EP map, an I picture position in the source packet is obtained based on the data. The reproduction processing can perform reproduction processing from an arbitrary position by obtaining the position of the I picture from the EP map.

Next, description will be given of ClipMark 205 in the syntax shown in FIG. 23.

The ClipMark 205 is mark information for a clip and is stored in the ClipMark. This mark is designed to be set by a recorder (recording and reproducing apparatus 1) and is not set by the user.

Next, description will be given of
MakersPrivateData( ) 206
in the syntax shown in FIG. 23.

Even in the clip information file, a maker private data area is set in the same manner as in the playlist file and the info file. That is, an area in which a maker providing an information processing apparatus such as a recording and reproducing device can freely record information is set.

This example is an example in which three-dimensional image information (multiview_video_info) is recorded in the maker private data area in the clip information file.

In addition, even in the maker private data area in the clip information file, the data recording areas, namely
the maker ID [maker_ID] recording area,
the maker model code [maker_model_code] recording area, and
the data block [data_block] recording area
are set in the same manner as in the info file shown in FIG. 7.

When the three-dimensional image information (multiview_video_info) is recorded in the maker private data area in the clip information file, identification information on whether or not the data recorded in the data block is three-dimensional image information is recorded in the maker ID recording area in the clip information file. Similarly, version information of the three-dimensional image information recorded in the data block is recorded in the maker model code [maker_model_code] in the clip information file. They have the same recording configurations as those in the case of the info file described above with reference to FIG. 8.

Referring to FIG. 29, description will be given of a specific example of the three-dimensional image information (multiview_video_info) recorded in the data block [data_block] recording area in the maker private data area in the clip information file.

In the data block [data_block] recording area in the maker private data area in the clip information file, the following information is recorded, for example, as shown in FIG. 29.

The information of
a program sequence number (number_of_program_sequences) 220,
a three-dimensional image flag [ClipInfo_multiview_video_flag] 221,
a three-dimensional image configuration information [ClipInfo_multiview_video_configuration] 222,
a frame zero image identification flag [ClipInfo_frame0_is_Left_flag] 223,
a base image identification flag [ClipInfo_base_view_is_Left_flag] 224,
a clip corresponding image identification flag [ClipInfo_this_clip_is_Left_flag] 225,
a coding state identification flag [ClipInfo_use_entropy_coding_mode_flag] 226, and
an inter-image reference identification flag [ClipInfo_use_inter-view_prediction_flag] 227
is recorded in each clip information file.

The program sequence number (number_of_program_sequences) 220 is a number of the program sequences included in the clip information file. In the clip information file, one or more program sequences are included. The program sequence is a content reproduction time section in which processing does not greatly shift since the number of the video elementary streams and coding information do not vary, as described above with reference to FIG. 24 and the like, and corresponds to a divided reproduction section of the entire reproduction section of the AV stream file associated with the clip information file in an one-to-one relationship. That is, it is possible to set a plurality of program sequences between the reproduction start point (IN_time) and the reproduction end point (OUT_time) designated by the reproduction path (play item) in the playlist.

The three-dimensional image flag 221 to the inter-image reference identification flag 227 shown in FIG. 29 are information which maintains the three-dimensional image information in the playlist file described above with reference to FIG. 11. The three-dimensional image information is recorded in units of program sequences.

Accordingly, three-dimensional image information corresponding to different program sequences is different information in some cases.

The apparatus which performs content recording determines whether or not a three-dimensional image is included in the recorded content and records the various kinds of three-dimensional image information shown in FIG. 29 in units of program sequences in the data block [data_block] recording area in the maker private data area in the clip information file in accordance with the determination information.

The apparatus which executes content reproduction can correctly execute three-dimensional image reproduction by applying the information recorded in the clip information file in units of program sequences.

Description will be given of specific examples of the three-dimensional image information recorded in the data block [data_block] recording area in the maker private data area in the clip information file shown in FIG. 29, namely the information from the three-dimensional image flag 221 to the inter-image reference identification flag 227 with reference to FIG. 30 and the subsequent drawings. In addition, the information is individually recorded in units of program sequences as described above.

(Three-dimensional Image Flag [ClipInfo_multiview_video_flag] 221)

First, description will be given of a specific example of the three-dimensional image flag 221 with reference to FIG. 30.

A value of the three-dimensional image flag=0: only 2D content is included and no 3D content is included in the reproduction target content in the program sequence in this clip information.

The value of the three-dimensional image flag=1: there is a possibility that 3D content is included in the reproduction target content in the program sequence in this clip information.

The information of one of the flag=0/1 is recorded as described above.

In addition, the apparatus which executes content recording determines whether or not a three-dimensional image is included in the recorded content and records the above flag in accordance with the determination information. This processing is executed corresponding to each of the program sequences set in the clip information file.

The apparatus which executes content reproduction can refer to the values of the flag in units of program sequences in the clip information file and identify whether or not the three-dimensional image is included in the content in units of program sequences.

(Three-dimensional Image Configuration Information [ClipInfo_multiview_video_configuration] 222)

Next, description will be given of a specific example of the three-dimensional image configuration information 222 with reference to FIG. 31.

The three-dimensional image configuration information 222 is set as an area in which coding state information of a three-dimensional image as content to be reproduced by the clip information is recorded.

Specifically, the following setting is made as shown in FIG. 31.
the value=3: side by side scheme (side by side)
the value=4: top and bottom scheme (top and bottom)
the value=5: frame sequential scheme (frame sequential)
the value=30: MVC coding two-elementary stream/one-system stream (the clip includes two MVC-coded elementary streams)
the value=31: MVC coding two-elementary stream/two-system stream (the clip includes one of two MVC coded elementary streams)
the value=32: MVC coding one-elementary stream/one-system stream
the value=40: independent two-elementary stream/one-system stream (the clip includes two elementary streams coded in a different manner from the MVC coding)
the value=41: independent two-elementary stream/two-system stream (the clip includes one of two elementary streams coded in a different manner from the MVC coding)

The above coding configuration information is recorded.

However, when different types of 3D content are in the program sequence, or when the type of the 3D content is not known, 20 (no information) is set.

The side by side scheme when the value=3 corresponds to the coding scheme shown in FIG. 1(1).

The top and bottom scheme when the value=4 corresponds to the coding scheme shown in FIG. 1(2).

The frame sequential scheme when the value=5 corresponds to the coding scheme shown in FIG. 1(3).

The MVC coding schemes in the case of the values from 30 to 33 correspond to the coding scheme shown in FIG. 2(4).

This case is classified into a case in which the number of elementary streams is one or two or a case in which the number of the system streams is one or two.

The coding schemes in the case of the values from 40 to 41 correspond to the coding scheme shown in FIG. 2(5).

This case is also classified into a case in which the number of the elementary streams is two or a case in which the number of the system streams is one or two.

When a three-dimensional image is included in the recorded content, the apparatus which executes content recording records the above value in accordance with the coding state information. This processing is executed corresponding to each of the program sequences set in the clip information file.

In addition, the three-dimensional image recording is executed in setting in which the program sequences are separately recorded every time the types of the 3D content vary and one program sequence has one coding state.

The apparatus which executes content reproduction can refer to the above value, identify the coding state of the content to be reproduced using the clip information, and execute decoding processing corresponding to the identification information. It is possible to determine the coding state of the three-dimensional image in units of program sequences and execute decoding in accordance with the state.

(Frame Zero Image Identification Flag [ClipInfo_frame0_is_Left_flag] 223)

Next, description will be given of a specific example of the frame zero image identification flag 223 with reference to FIG. 32.

The frame zero image identification flag 223 is information recorded when a coding scheme of a three-dimensional image is a frame sequential scheme (see FIG. 1(3)) and used for reproduction. That is, the frame zero image identification flag 223 is used when the three-dimensional image configuration information=5 described above with reference to FIG. 31.

As described above, the image for the left eye (L image) and the image for the right eye (R image) are set as alternate frames in the case of the frame sequential scheme as shown in FIG. 1(3).

For example, one of the combinations, namely
the frame zero is the image for the left eye (L image), and the frame one is the image for the right eye (R image), or
the frame zero is the image for the right eye (R image), and the frame one is the image for the left eye (L image)
is set.

It is possible to obtain a correct sense of perspective if the L image is observed only by the left eye of the user and the R image is observed only by the right eye. The information for correctly setting the display sequence of the LR images is the frame zero image identification flag 223 shown in FIG. 32.

Specifically, information of
the value=2: the frame zero is the image for the right eye (R image), or
the value=3: the frame zero is the image for the left eye (L image)

is recorded as shown in FIG. 32, for example.

However, when it is not possible to obtain information on which one of L/R the frame zero corresponds to, 0 (no information) is recorded.

When a three-dimensional image is included in the recorded content, and the coding scheme thereof is the frame sequential scheme, the apparatus which executes content recording records the above value in accordance with the frame information. This processing is executed corresponding to each of the program sequences set in the clip information file.

The apparatus which executes content reproduction can refer to the above value, correctly determine whether the frame zero is the L image or the R image, and correctly perform reproduction and display of the LR images in performing the decoding processing of content reproduced using the clip information. The reproducing apparatus can execute determination in units of program sequences and execute the decoding processing based on the determination information.
(Base Image Identification Flag [ClipInfo_base_view_is_Left_flag] 224)

Next, description will be given of a specific example of the base image identification flag 224 with reference to FIG. 33.

The base image identification flag 224 is information recoded when a coding scheme of a three-dimensional image is the MVC coding scheme (see FIG. 2(4)) and used for reproduction. That is, the base image identification flag 224 is used when the three-dimensional image configuration information=30 to 32 described above with reference to FIG. 31.

In the MVC coding scheme described above with reference to FIG. 2(4), reference coding processing is performed between the L image and the R image in some cases. When coding based on the inter-view reference is performed, one of LR is regarded as a base view (base image), and decoding of the other image is performed with reference to the base view.

The base image identification flag 224 is a value representing which one of the L image and the R image the base view is. Specifically, the information of
the value=2: the base view is the image for the right eye (R image) or
the value=3: the base view is the image for the left eye (L image)
is recorded as shown in FIG. 33, for example.

However, when it is not possible to obtain information on which one of L/R the base view corresponds to, 0 (no information) is recorded.

When a three-dimensional image is included in the recorded content, and the coding scheme thereof is the MVC coding scheme (see FIG. 2(4)), the apparatus which executes content recording records the above value in accordance with the base view information. The recording processing is executed in units of program sequences.

The apparatus which executes content reproduction can refer to the above value, determine which one of the LR images the base value is, and correctly decode and display the LR image in performing the decoding processing of content reproduced using the clip information. It is possible to obtain the information in units of program sequences and shift processing.
(Clip Corresponding Image Identification Flag [ClipInfo_this_clip_is_Left_flag] 225)

Next, description will be given of a specific example of the clip corresponding image identification flag 225 with reference to FIG. 34.

The clip corresponding image identification flag 225 records a flag used in the case of the coding scheme described above with reference to FIG. 2(5), namely the coding scheme [independent stream (two streams) with no inter-view reference (not MVC)] and in the case of the independent two-elementary stream/two-system stream (two-clip AV stream).

Specifically, the clip corresponding image identification flag 225 is used in the case of the setting of the three-dimensional image configuration information=41: independent two-elementary stream/two-system stream (the clip includes two elementary streams coded in a different manner from the MVC coding) described above with reference to FIG. 31.

The clip corresponding image identification flag 225 is information representing which one of the clip for the image for the left eye (L image) and the clip for the image for the right eye (R image) configuring the three dimensional image the clip is. In addition, this information is set as information in units of program sequences.

Specifically, as shown in FIG. 34, for example,
when the value=2: the clip is a clip for the image for the right eye (R image), and the other clip of the pair is a clip for the image for the left eye (L image), and
when the value=3: the clip is a clip for the image for the left eye (L image), and the other clip of the pair is a clip for the image for the right eye (R image).

That is, when the value=3, the clip corresponding image identification flag 225 represents that the clip is the L image (Left view) and the other clip of the pair is the R image (Right view). In addition, when the value=2, the clip corresponding image identification flag 225 represents that the clip is the R image (Right view) and the other clip of the pair is the L image (Left view).

In addition, when it is not possible to obtain information on which one of L/R the content corresponding to the program sequence corresponds to, 0 (no information) is set.

When a three-dimensional image is included in the recorded content, and the coding state is the three-dimensional image configuration information=41: independent two-elementary stream/two-system stream described above with reference to FIG. 31, the apparatus which executes content recording records the above value in accordance with the setting of the clip information to be created or updated. The recording processing is executed in units of program sequences.

The apparatus which executes content reproduction can refer to the above value, correctly determine a reproduction path of which one of the LR images each of the main path and the sub path is, and correctly decode and display the LR images. It is possible to obtain information in units of program sequences and shift the processing.
(Coding State Identification Flag [ClipInfo_use_entropy_coding_mode_flag] 226)

Next, description will be given of a specific example of a coding state identification flag 226 with reference to FIG. 35.

The coding state identification flag 226 records a flag used in the case of the coding scheme described above with reference to FIG. 2(4)<namely the coding scheme of [stream with inter-view reference (MVC)].

Specifically, the coding state identification flag 226 is used in the case of the setting of the three-dimensional image configuration information=30 to 32 described above with reference to FIG. 31.

The coding state identification flag 226 is an identification flag representing whether or not coding processing using the entropy coding mode is executed as the coding processing.

In addition, the coding processing using the entropy coding mode is specifically coding processing using CABAC(Context-based Adaptive Binary Arithmetic Coding), for example.

The coding processing which does not use the entropy coding mode is specifically coding processing using CAVLC (Context-based Adaptive Variable Length Coding), for example.

Specifically, information of
the value=1: the entropy coding mode is not used, or
the value=2: there is a possibility that the entropy coding mode is used
is recorded as shown in FIG. 35, for example.

In addition, when information relating the coding of the coded data corresponding to the program sequence in the clip information cannot be obtained, 0 (no information) is set.

When a three-dimensional image is included in the recorded content, and the coding state is the MVC coding scheme (see FIG. 2(4)), the apparatus which executes content recording records the above value in accordance with whether or not the entropy coding mode is applied to the coding processing. The recording processing is executed in units of program sequences.

The apparatus which executes content reproduction refer to the above value, know the coding state, and correctly decode and display the LR images in performing the decoding processing of the content reproduced using the clip information. It is possible to obtain the information in units of program sequences and shift the processing.

In addition, the reproducing apparatus, for example, is an apparatus which cannot execute decoding of CAVLC coding in the entropy coding mode in some cases. In such a case, processing of suspending the decoding and reproducing processing of the three-dimensional image based on the setting information of the coding state identification flag 226 and reproducing a two-dimensional image by reproducing only the L image or the R image can be executed. Since the reproducing apparatus cannot identify whether or not the coding has been made in a coding state that the reproducing apparatus can reproduce if this flag is not present, the reproducing apparatus start the decoding processing, and as a result, a processing error occurs.

(Inter-Image Reference Identification Flag [ClipInfo_use_inter-view_prediction_flag] 227)

Next, description will be given of an inter-image reference identification flag [ClipInfo_use_inter-viewprediction_flag] 227 with reference to FIG. 36.

The inter-image reference identification flag 227 also records a flag used in the case of the coding scheme described above with reference to FIG. 2(4), namely the coding scheme of [stream with inter-view reference (MVC)].

Specifically, the inter-image reference identification flag 227 is used in the case of the setting of the three-dimensional image configuration information=30 to 32 described above with reference to FIG. 31.

The inter-image reference identification flag 227 is information representing whether or not coding for which inter-view reference is executed has been performed in the case of the setting of the three-dimensional image configuration information=30 to 32 described above with reference to FIG. 31. Even in the coding processing based on the coding scheme described above with reference to FIG. 2(4), namely based on the setting of the [stream with inter-view reference (MVC)], there is also a case in which the reference processing between the L image and the R image has not been executed in practice.

Specifically, in relation to the coded data as reproduction content corresponding to the program sequence in one clip information, there is a case in which
only the coded data with no reference between the L image and the R image is included, or
the coded data with reference between the L image and the R image is included.

A flag which makes it possible to identify such two kinds of data is set as the inter-image reference identification flag 227.

Specifically, information of
the value=1: no inter-view reference or
the value=2: there is a possibility that inter-view reference is included
is set as shown in FIG. 36, for example.

However, when the information relating to the coding of the coded data corresponding to the program sequence in the clip information cannot be obtained, 0 (no information) is set.

When a three-dimensional image is included in the recorded content, and the coding state is the MVC coding scheme (see FIG. 2(4)), the apparatus which executes content recording records the above value in accordance with whether or not the inter-view reference has been executed in the coding processing.

The apparatus which executes the content reproduction can refer to the above value, know the coding state, and correctly decode and display the LR images in performing the decoding processing of the content reproduced using the clip information.

[4. Concerning Processing Sequence Executed by Information Processing Apparatus]

Next, description will be given of a processing sequence executed by the information processing apparatus with reference to flow charts in FIG. 37 and the subsequent drawings. In addition, the processing described in the following flow is executed by a data processing unit in the information processing unit. The data processing unit includes a CPU which has a program executing function. A series of processing is executed based on a program recorded in a memory, for example.

(4-1. Content Recording Processing Sequence)

First, description will be given of a processing sequence of recording data in a medium with reference to the flow chart shown in FIG. 37. In addition, this processing is processing in the case in which the recorded data includes three-dimensional image content.

In Steps S101 to S103, the information processing apparatus checks a number of image (video) elementary streams of three-dimensional image content obtained by imaging processing, for example, or input from the outside and a number of transport streams. The information is obtained from the attribute information (metadata) or the like set in input data or obtained by analyzing an input stream in Step S101.

In addition, the elementary stream is a data stream right after encoding of the image, the transport stream is stream data in which time stamp or other data such as data for synchronization with audio information or the like is set, and the processing of generating an MPEG data file (an m2ts file, for example, based on the transport stream obtained by multiplexing the elementary streams and recording the MPEG data file in the medium is executed.

When a three-dimensional image is recorded, there is a case in which an L image and an R image are set in individual elementary steams and a case in which the L image and the R image are set in one elementary stream.

When the L image and the R image are set in one elementary stream, one transport steam is generated from the one elementary steam. When the L image and the R image are set in individual elementary streams, there is a case in which two individual transport streams are generated and a case in which one transport stream is generated for both the two elementary stream. This is determined based on the coding state and the like described above with reference to FIGS. 1 and 2.

In addition, when the coding scheme of the three-dimensional image is determined in advance in accordance with an input source such as a specific broadcasting station or a specific model of an apparatus, a configuration is applicable in which a table or the like in accordance with the input source is maintained and a state of input data is determined by processing of referring to the table.

In Step S102, it is determined which one of one and two the number of the image (video) elementary streams is, and the processing proceeds to Step S121 in the case of one, or the processing proceeds to Step S103 in the case of two.

In Step S103, it is determined which one of one and two the number of the transport streams is, and the processing proceeds to Step S121 in the case of one, or the processing proceeds to Step S111 in the case of two.

The case in which the processing proceeds to Step S111 is a case in which the L image and the R image configuring the three-dimensional image are set as individual, namely two transport streams.

On the other hand, the case in which the processing proceeds to Step S121 is a case in which the L image and the R image configuring the three-dimensional image are set in one transport stream.

First, description will be given of processing in Step S111 and subsequent steps. That is, processing in the case in which the L image and the R image configuring the three-dimensional image are set as individual, namely two transport streams will be described.

In Step S111, two input streams are analyzed, and the two input streams are recorded as separate AV stream files (MPEG-2 transport stream (m2ts) files) while the entry point map is created. That is, two clips are created. Here, the clip described here means a file set of an AV stream file storing the content entity and a clip information file as a management information file.

In Step S112, the following processing is performed for each m2ts file corresponding to the two clips.

A program sequence representing a 3D content part is created.

The three-dimensional image flag [ClipInfo_multiview_video_flag] in the clip information file is set to [1] and recorded in the clip information file with the entry point map (EP map).

As described above, the information is recorded in units of program sequences (program_sequences) as reproduction section units obtained by dividing the clip. The program sequence has only one system time base at the same moment and has only one PMT (Program Map Table) at the same moment.

In addition, as described above with reference to FIGS. 23 and 26 to 28, the entry point map (EP map) which records therein the IP picture position information or the like as a reproduction start point in random reproduction, for example, is recorded in the clip information file.

In Step S112, the clip information file is created for each of the clips corresponding to the LR images. In addition, processing of recording three-dimensional image information is performed as well as the processing of setting of the three-dimensional image flag [ClipInfo_multiview_video_flag] in the clip information file to [1] in units of program sequences in performing this processing.

Figure 38:
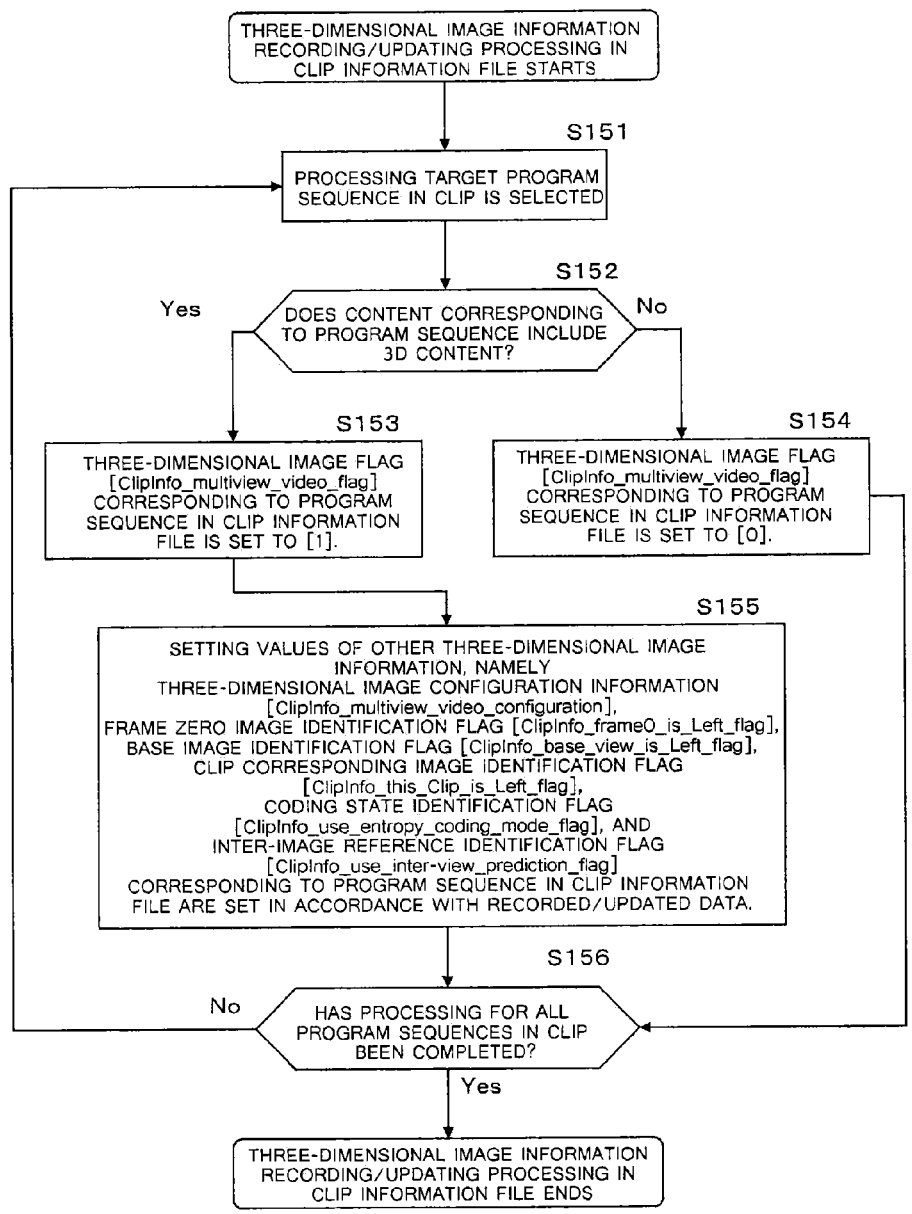
FIG. 38 is a diagram showing a flowchart illustrating a recording/updating processing sequence of three-dimensional image information in the clip information file, which is executed by the information processing apparatus.
Figure 39:
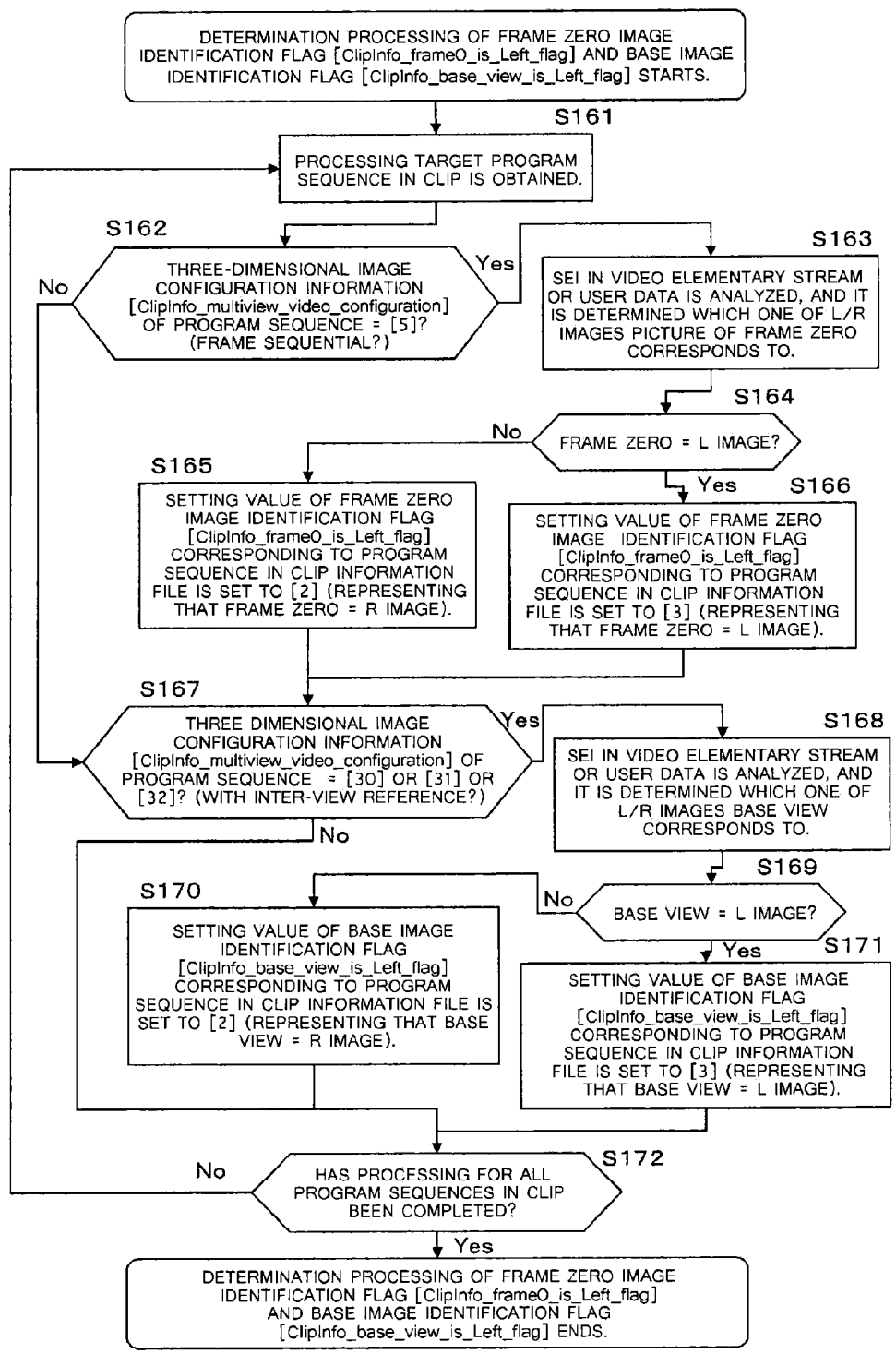
FIG. 39 is a diagram showing a flowchart illustrating a recording/updating processing sequence of a frame zero image identification flag and a base image identification flag as the three-dimensional image information in the clip information file, which is executed by the information processing apparatus.

In addition, the detail of this processing will be described later with reference to the flowcharts shown in FIGS. 38 and 39.

The subsequent processing in Steps S113 to S115 is processing relating to a playlist file.

First, in Step S113, reproduction path information (play item (PlayItem)) referring to a position of a clip including 3D content is generated for a first clip.

In addition, a clip corresponding to one of the LR images as a configuration stream of the three-dimensional image content is referred to as a first clip, and the clip corresponding to the other image is referred to as a second clip.

In Step S114, reproduction path information (sub play item (SubPlayItem)) referring to the position of the clip including the 3D content is generated for the second clip.

In Step S115, a playlist configured by the main path (play item (PlayItem)) and the sub path (sub play item (SubPlayItem)) is created. Furthermore, the three-dimensional image flag [Playlist_multiview_video_flag] in the playlist file is set to [1] representing that the playlist includes three-dimensional image content.

In addition, in creating the playlist file, processing of setting a value in accordance with a recorded image is executed for the three-dimensional image information other than the three-dimensional image flag. The detail of the processing will be described later with reference to a flowchart shown in FIG. 40.

Finally, in Step S131, the info file is updated. In the processing, processing of setting the three-dimensional image flag [Index_multiview_video_flag] to [1] representing that the 3D content is included in the three-dimensional image information recorded in the info file is performed.

Next, description will be given of processing in Step S121 and subsequent steps. That is, processing in the case in which both the L image and the R image configuring the three-dimensional image are set as one transport stream will be described.

In Step S121, one input stream is analyzed, and the input stream is recorded as one AV stream file (MPEG-2 transport stream (m2ts) file) while the entry point map is created. That is, one clip is created. The clip means a file set of the AV stream file storing content entity and the clip information file as a management information file.

In Step S122, the following processing is performed in the m2ts file corresponding to the clip.

The program sequence representing a 3D content part is created.

The three-dimensional image flag [ClipInfo_multiview_video_flag] in the clip information file is set to [1] and recorded with the entry point map (EP map) in the clip information file.

In addition, the processing of recording the three-dimensional image information is performed as well as the processing of setting the three-dimensional image flag [ClipInfo_multiview_video_flag] in the clip information file to [1] in units of program sequences in performing this processing. The detail of this processing will be described later with reference to flowcharts shown in FIGS. 38 and 39.

The subsequent processing in Steps S123 to S124 is processing relating to the playlist file.

First, in Step S123, the reproduction path information (play item (PlayItem)) referring to the position of the clip including the 3D content is crated for the clip.

In this case, in relation to the clip, both the LR images are stored in one clip, the created path information is only for the main path (play item), and the sub path (sub play item) for the three-dimensional image is not created.

In Step S124, a playlist configuring the main path (play item (PlayItem)) is created. Furthermore, the three-dimensional image flag [Playlist_multiview_video_flag] in the playlist file is set to [1] representing the playlist including three-dimensional image content.

In addition, in creating the playlist file, processing of setting a value in accordance with the recorded image is executed even on the three-dimensional image information other than the three-dimensional image flag. The detail of the processing will be described later with reference to the flowchart shown in FIG. 40.

Finally, in Step S131, the info file is updated. In performing this processing, processing of setting the three-dimensional image flag [Index_multiview_video_flag] to [1] for representing the 3D content is included in the three-dimensional image information recorded in the info file is performed.

(4-2. Recording/Updating Processing Sequence of Three-Dimensional Image Information in Clip Information File)

Next, description will be given of a processing sequence for recording or updating three-dimensional image information in the clip information file with reference to the flowchart shown in FIG. 38.

Figure 37:
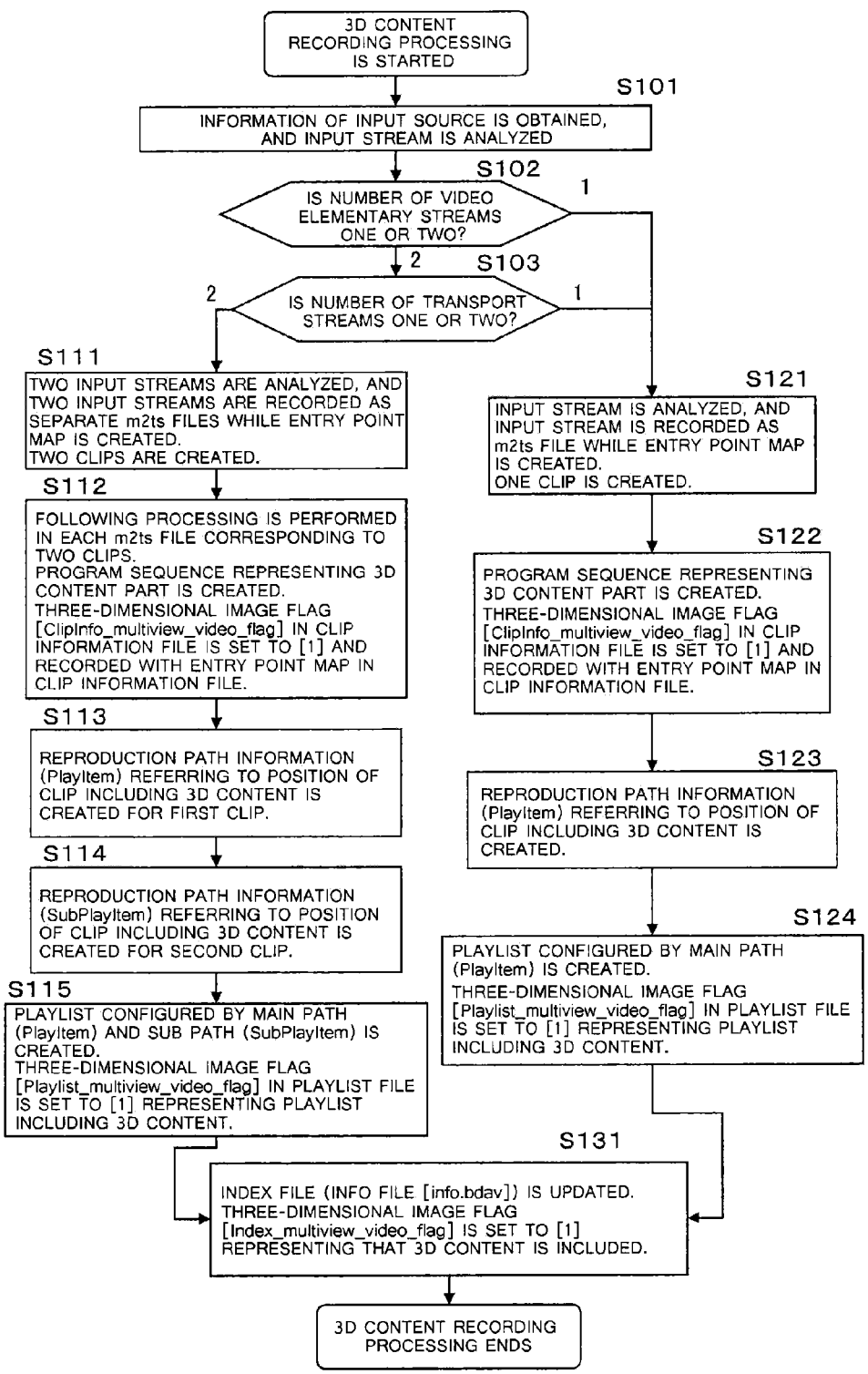
FIG. 37 is a diagram showing a flowchart illustrating a content recording processing sequence executed by an information processing apparatus.

This processing is a flow showing the detail of the processing in Steps S112 and S122 in the flow shown in FIG. 37.

First, in Step S151, a program sequence as a processing target is selected in the clip.

Next, in Step S152, it is determined whether or not content corresponding to the selected program sequence includes 3D content. The processing proceeds to Step S153 when the 3D content is included, or the processing proceeds to Step S154 when the 3D content is not included.

When the 3D content is not included, the processing proceeds to Step S154, and the three-dimensional image flag [ClipInfo_multiview_video_flag] corresponding to the program sequence in the clip information file is set to [0]. That is, a flag representing that a three-dimensional image is not included in the content corresponding to the program sequence is set. Thereafter, the processing proceeds to Step S156.

On the other hand, when it is determined that the content corresponding to the selected program sequence includes the 3D content in Step S152, the processing proceeds to Step S153, and the three-dimensional image flag [ClipInfo_multiview_video_flag] corresponding to the program sequence in the clip information file is set to [1]. That is, a flag representing that the three-dimensional image is included in the content corresponding to the program sequence is set.

Furthermore, the processing proceeds to Step S155, and the recording processing of other three-dimensional image information corresponding to the program sequence in the clip information file is executed. That is, the value setting processing is performed for the following three-dimensional image information described above with reference to FIG. 29.

The processing of setting the setting values of
the three-dimensional image configuration information [ClipInfo_multiview_configuration],
the frame zero image identification flag [ClipInfo_frame0_is_Left_flag],
the base image identification flag [ClipInfo_base_view_is_Left_flag],
the clip corresponding image identification flag [ClipInfo_this_Clip_is_Left_flag],
the coding state identification flag [ClipInfo_use_entropy_coding_mode_flag], and
the inter-image reference identification flag [ClipInfo_use_inter-view_prediction_flag]
in accordance with the recorded/updated data is performed.

In addition, the information is set in accordance with the information such as a coding state or the like of the recorded three-dimensional image.

After the processing, the processing proceeds to Step S156. In Step S156, it is determined whether or not the processing for all program sequences set in the clip has been completed, and if there are uncompleted program sequences, the processing in Step S151 and the subsequent steps is performed on the uncompleted program sequences.

When it is determined in Step S156 that the processing for all program sequences set in the clip has been completed, the processing is terminated.

(4-3. Recording/Updating Processing Sequence of Frame Zero-Image Identification Flag and Base Image Identification Flag as Three-Dimensional Image Information in Clip Information File)

Next, description will be given of a recording sequence of the following information in the three-dimensional image information recorded in the clip information file, namely, the information of
the frame zero image identification flag [ClipInfo_frame0_is_Left_flag] and
the base image identification flag [ClipInfo_base_view_is_Left_flag]
with reference to the flowchart shown in FIG. 39.

First, in Step S161, a program sequence as a processing target is selected in the clip.

Next, in Step S162, the three-dimensional image configuration information [ClipInfo_multiview_video_configuration] is obtained from the three-dimensional image information corresponding to the selected program sequence, and it is determined whether or not the setting value is [5]. That is, it is determined whether or not the coding scheme is the frame sequential scheme.

In the reproducing apparatus, the frame zero image identification flag is a value referred to only in the case of the frame sequential scheme, and even in the recording processing, the recording of effecting information is executed only when the recorded image is based on the frame sequential scheme.

The processing proceeds to Step S163 when it is determined in Step S162 that the setting value of the three-dimensional image configuration information is [5], and the processing proceeds to Step S167 when it is determined that the setting value is not [5].

When it is determined in Step S162 that the setting value of the three-dimensional image configuration information is [5], metadata in the image (video) elementary stream such as SEI (Supplemental Enhancement Information) or user data is analyzed to determine which one of the L/R images the image of the frame zero corresponds to in Step S163.

When it is determined in Step S164 that the image of the frame zero is the L image, the processing proceeds to Step S166, and the setting value of the frame zero image identification flag [ClipInfo_frame0_is_Left_flag] corresponding to the program sequence in the clip information file is set to [3] (representing that the frame zero=the L image).

On the other hand, when it is determined in Step S164 that the image of the frame zero is the R image, the processing proceeds to Step S165, and the setting value of the frame zero image identification flag [ClipInfo_frame0_is_Left_flag] corresponding to the program sequence in the clip information file is set to [2] (representing that the frame zero=the R image).

After the completion of the processing, the processing proceeds to Step S167.

In Step S167, the three-dimensional image configuration information [ClipInfo_multiview_video_configuration] is obtained from the three-dimensional image information corresponding to the selected program sequence, and it is determined which one of [30], [31], and [32] the setting value is.

That is, it is determined whether or not the coding scheme is the coding scheme with a possibility that the inter-view reference is executed.

In the reproducing apparatus, the base image identification flag [ClipInfo_base_view_is_Left_flag] is a value referred to only in the case of the coding scheme with the possibility that the inter-view reference is executed, and even in the recording processing, the recording of the effective information is executed only in the case in which the recorded image is based on the coding scheme with the possibility that the inter-view reference is executed.

The processing proceeds to Step S168 when it is determined in Step S167 that the setting value of the three-dimensional image configuration information is [30], [31], or [32], or the processing proceeds to Step S172 when it is determined that the setting value is not [30], [31], or [32].

When it is determined in Step S167 that the setting value of the three-dimensional image configuration information is [30], [31], or [32], the metadata in the image (video) elementary stream such as SEI (Supplemental Enhancement Information) or the user data is analyzed, and it is determined in Step S168 which one of the L/R images the image of the base view corresponds to.

When it is determined in Step S169 that the base view image is the L image, the processing proceeds to Step S171, and the setting value of the base image identification flag [ClipInfo_base_view_is_Left_flag] corresponding to the program sequence in the clip information file is set to [3] (representing that the base view=the L image).

On the other hand, when it is determined in Step S169 that the base view image is the R image, the processing proceeds to Step S170, and the setting value of the base image identification flag [ClipInfo_base_view_is_Left_flag]corresponding to the program sequence in the clip information file is set to [2] (representing that the base view=the R image).

After the above processing, the processing proceeds to Step S172. In Step S172, it is determined whether or not the processing for all program sequences set in the clip has been completed, and if there are incomplete program sequences, the processing in Step S161 and the subsequent steps is executed on the incomplete program sequences.

When it is determined in Step S172 that the processing for all program sequences set in the clip has been completed, the processing is terminated.

(4-4. Recording/Updating Processing Sequence of Three-Dimensional Image Information in Play List File)

Figure 40:
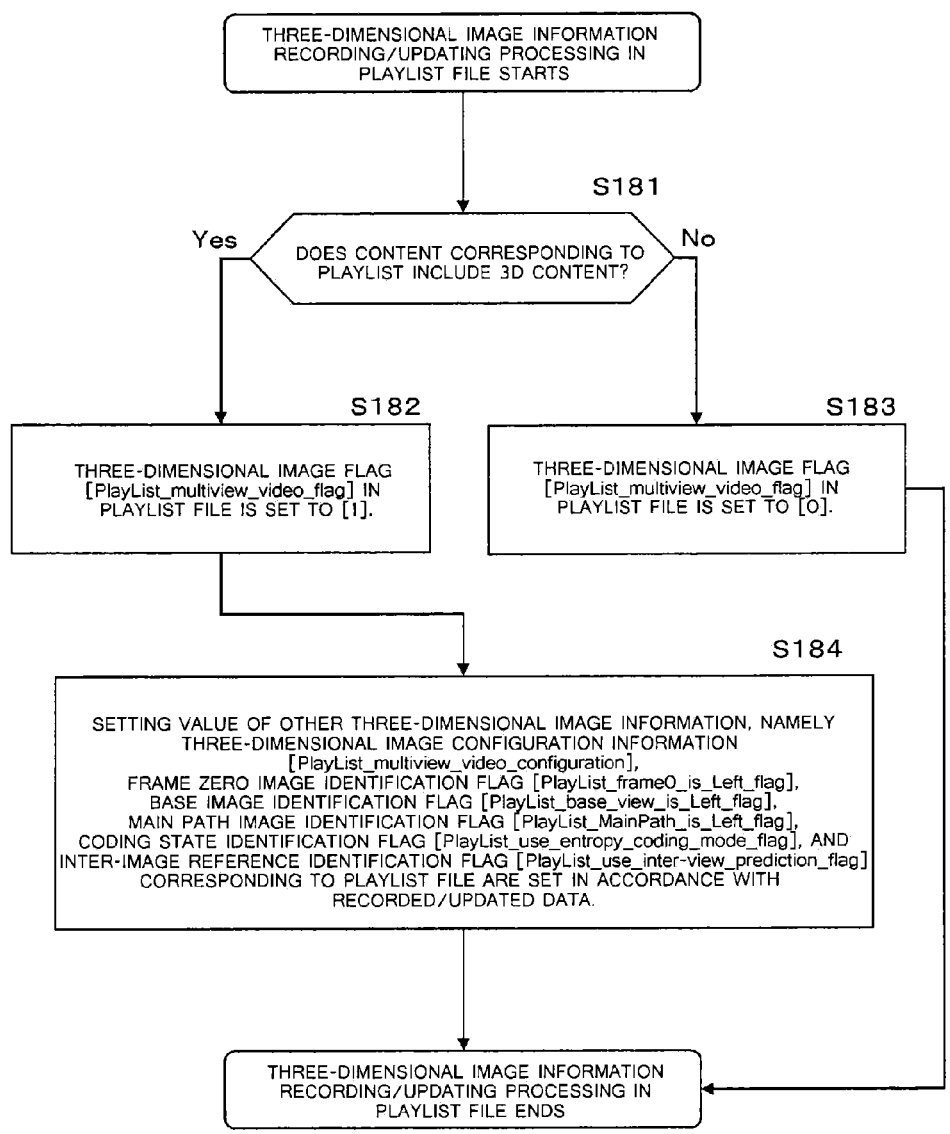
FIG. 40 is a diagram showing a flowchart illustrating a recording/updating processing sequence of the three-dimensional image information in the playlist file, which is executed by the information processing apparatus.

Next, description will be given of a processing sequence of recording or updating the three-dimensional image information in the playlist file with reference to the flowchart shown in FIG. 40.

This processing is a flow showing the detail of the processing in Steps S115 and S124 in the flow shown in FIG. 37.

First, in Step S181, it is determined whether or not content corresponding to the playlist as a processing target includes 3D content. The processing proceeds to Step S182 when the 3D content is included, or the processing proceeds to Step S183 when the 3D content is not included.

When the 3D content is not included, the processing proceeds to Step S183, and the three-dimensional image flag [PlayList_multiview_video_flag] of the playlist file is set to [0]. That is, a flag representing that a three-dimensional image is not included in the content corresponding to the playlist is set, and the processing is terminated.

On the other hand, when it is determined in Step S181 that the content corresponding to the playlist as a processing target includes 3D content, the processing proceeds to Step S182, and the three-dimensional image flag [PlayList_multiview_iew_video_flag] corresponding to the program sequence in the playlist file is set to [1]. That is, a flag representing that a three-dimensional image is included in the content corresponding to the playlist is set.

Furthermore, the processing proceeds to Step S184, and the recording processing of other three-dimensional image information in the playlist file is executed. That is, value setting processing for the following three-dimensional image information described above with reference to FIG. 11 is executed.

The processing of setting the setting values of the three-dimensional image configuration information [PlayList_multiview_video_configuration],
the frame zero image identification flag [PlayList_frame0_is_Left_flag],
the base image identification flag [PlayList_base_view_is_Left_flag],
the main path image identification flag [PlayList_MainPath_is_Left_flag],
the coding state identification flag [PlayList_use_entropy_coding_mode_flag], and
the inter-image reference identification flag [PlayList_use_inter-view_prediction_flag]
in accordance with the recorded/updated data is performed.

In addition, the above information is set in accordance with the information such as the coding state or the like of the recorded three-dimensional image.

After the above processing, the processing is terminated.

(4-5. Content Additional Writing Processing Sequence)

Figure 41:
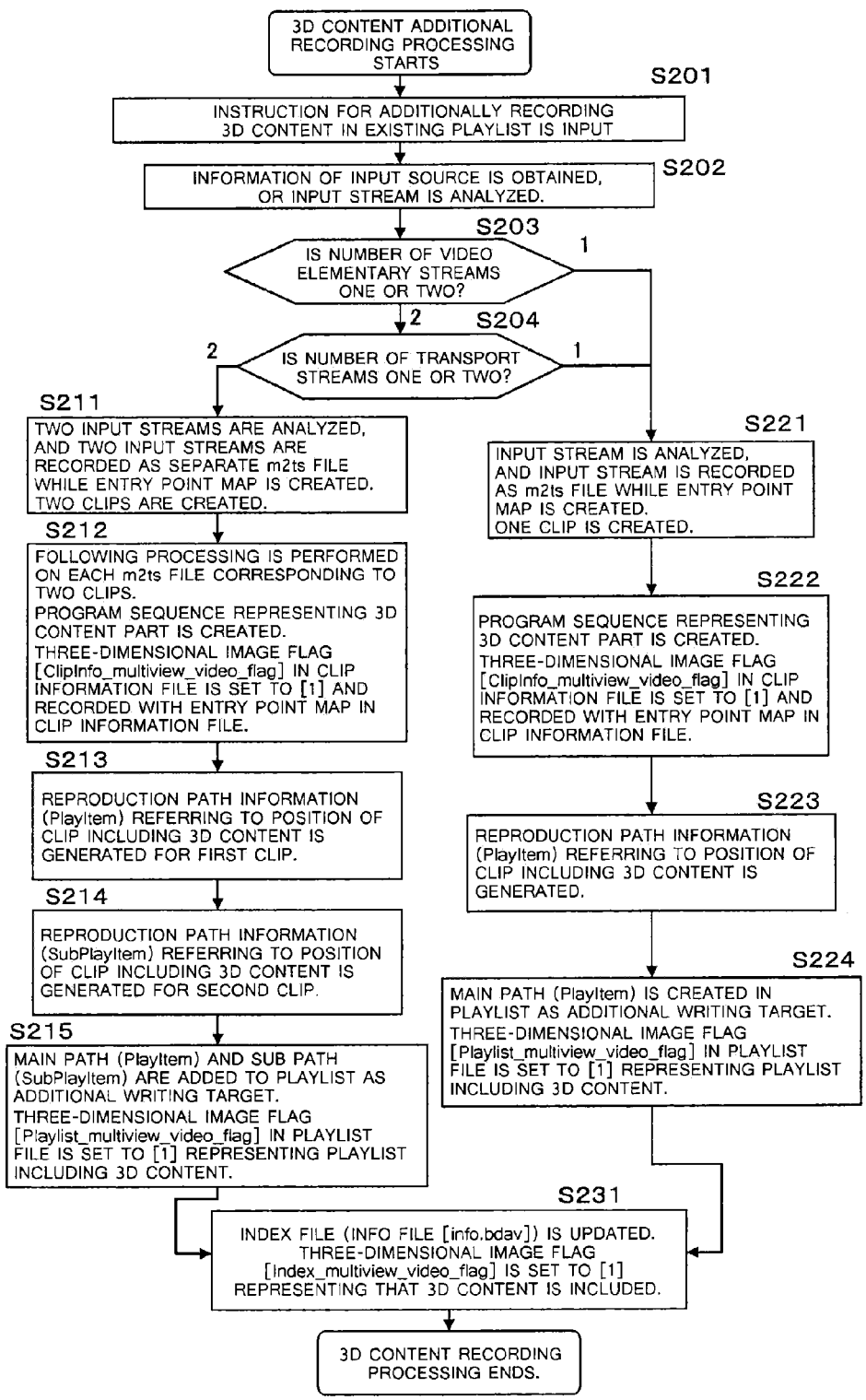
FIG. 41 is a diagram showing a flowchart illustrating a content additional writing processing sequence which is executed by the information processing apparatus.

Next, description will be given of a sequence of additional writing processing of a three-dimensional image with reference to FIG. 41.

That is, description will be given of a processing sequence in the case of additionally recording new content corresponding to an existing playlist when there is content which has been already recorded in a medium and the playlist corresponding to the recorded content is present in the medium.

First, in Step S201, an instruction for executing additional recording of the 3D content corresponding to the existing playlist is input. Instruction information from the user for additionally recording a captured image is input to a video camera, for example.

The processing in Step S202 and the subsequent steps is processing which is similar to the processing described above with reference to FIG. 37.

In Steps S202 to S204, the information processing apparatus checks a number of image (video) elementary streams of three-dimensional image content obtained by imaging processing, for example, or input from the outside and a number of transport streams. The information is obtained from the attribute information (metadata) or the like set in input data or obtained by analyzing an input stream in Step S202.

In Step S203, it is determined which one of one or two the number of the image (video) elementary streams is, and the processing proceeds to Step S121 in the case of one, or the processing proceeds to Step S204 in the case of two.

In Step S204, it is determined which one of one and two the number of the transport streams is, and the processing proceeds to Step S221 in the case of one, or the processing proceeds to Step S211 in the case of two.

The case in which the processing proceeds to Step S211 is a case in which the L image and the R image configuring the three-dimensional image are set as individual, namely two transport streams.

On the other hand, the case in which the processing proceeds to Step S221 is a case in which the L image and the R image configuring the three-dimensional image are set in one transport stream.

First, description will be given of the processing in Step S211 and the subsequent steps. That is, description will be given of the processing in the case in which the L image and the R image configuring the three-dimensional image are set as different, namely two transport streams.

In Step S211, two input steams are analyzed, and the two input streams are recorded as separate AV stream files (MPEG-2 transport stream (m2ts) files) while the entry point map is created. That is, two clips are created. In addition, the clip described here means a file set of an AV stream file storing the content entity and a clip information file as a management information file.

In Step S212, the following processing is performed for each m2ts FILE corresponding to the two clips.

A program sequence representing a 3D content part is created.

The three-dimensional image flag [ClipInfo_multiview_video_flag] in the clip information file is set to [1] and recorded with the entry point map (EP map) in the clip information file.

In Step S212, the clip information file is created for each of the clips corresponding to the LR images. In performing this processing, the processing of recording the three-dimensional image information is preformed as well as the processing of setting the three-dimensional image flag [ClipInfo_multiview_video_flag] in the clip information file to [1] in units of program sequences. In this step, the processing described above with reference to the flowcharts shown in FIGS. 38 and 39 are executed.

The next processing in Steps S213 to S215 is processing relating to the playlist file.

First, in Step S213, reproduction path information (play item (PlayItem)) referring to the position of the clip including the 3D content is created for a first clip.

In addition, a clip corresponding to one of the LR images as a configuration stream of the three-dimensional image content is referred to as a first clip, and the clip corresponding to the other image is referred to as a second clip.

In Step S214, reproduction path information (sub play item (SubPlayItem)) referring to the position of the clip including the 3D content is created for the second clip.

In Step S215, the main path (play item (PlayItem)) and the sub path (sub play item (SubPlayItem)) are added to the play list as a target of additional writing. Furthermore, the three-dimensional image flag [Playlist_multiview_video_flag] in the playlist file is set to [1] representing the playlist file in which three-dimensional image content is included.

In addition, in updating the playlist file, processing of setting a value in accordance with the recorded image is executed even on the three-dimensional image information as well as the three-dimensional image flag. The detail of the processing is as described above with reference to the flowchart shown in FIG. 40.

Finally, in Step S231, the info file is updated. In performing this processing, the processing of setting the three-dimensional image flag [Index_multiview_video_flag] to [1] representing that 3D content is included in the three-dimensional image information recorded in the info file is performed.

Next, description will be given of the processing in Step S221 and the subsequent steps. That is, description will be given of the processing in the case in which both the L image and the R image configuring the three-dimensional image is set as one transport stream.

In Step S221, one input stream is analyzed, and the input stream is recorded as one AV stream file (MPEG-2 transport stream (m2ts) file) while the entry point map is created. That is, one clip is created. The clip means a file set of an AV stream file storing content entity and a clip information file as a management information file.

In Step S222, the following processing is performed on the m2ts file corresponding to the clip.

A program sequence representing a 3D content part is created.

The three-dimensional image flag [ClipInfo_multiview_video_flag] in the clip information file is set to [1] and recorded with the entry point map (EP map) in the clip information file.

In addition, in performing this processing, the processing of recording the three-dimensional image information is performed as well as the processing of setting the three-dimensional image flag [ClipInfo_multiview_video_flag] in the clip information file to [1] in units of program sequences. The detail of this processing is as described above with reference to the flowcharts shown in FIGS. 38 and 39.

The next processing in Steps S223 to S224 is processing relating to the playlist file.

First, in Step S223, the reproduction path information (play item (PlayItem)) referring to the position of the clip including the 3D content is created for the clip.

In this case, in relation to the clip, both the LR images are stored in one clip, the generated path information is only the main path (play item), and the sub path (sub play item) for the three-dimensional image is not generated.

In Step S224, a main path (play item (PlayItem)) as reproduction path information corresponding to the additionally written content is created in the playlist as a target of the additional writing. Furthermore, the three-dimensional image flag [Playlist_multiview_video_flag] in the playlist file is set to [1] representing the playlist in which three-dimensional content is included.

In addition, in updating the playlist file, the processing of setting a value in accordance with the recorded image is executed even on the three-dimensional image information other than the three-dimensional image flag. The detail of this processing is as described above with reference to the flowchart shown in FIG. 40.

Finally, in Step S231, the info file is updated. In performing this processing, the processing of setting the three-dimensional image flag [Index_multiview_video_flag] to [1] representing that the 3D content is included in the three-dimensional image information recorded in the info file is performed.

(4-6. Content Editing Processing Sequence)

Next, description will be given of a sequence of data editing processing executed by the information processing apparatus with reference to a flowchart shown in FIG. 42.

Figure 42:
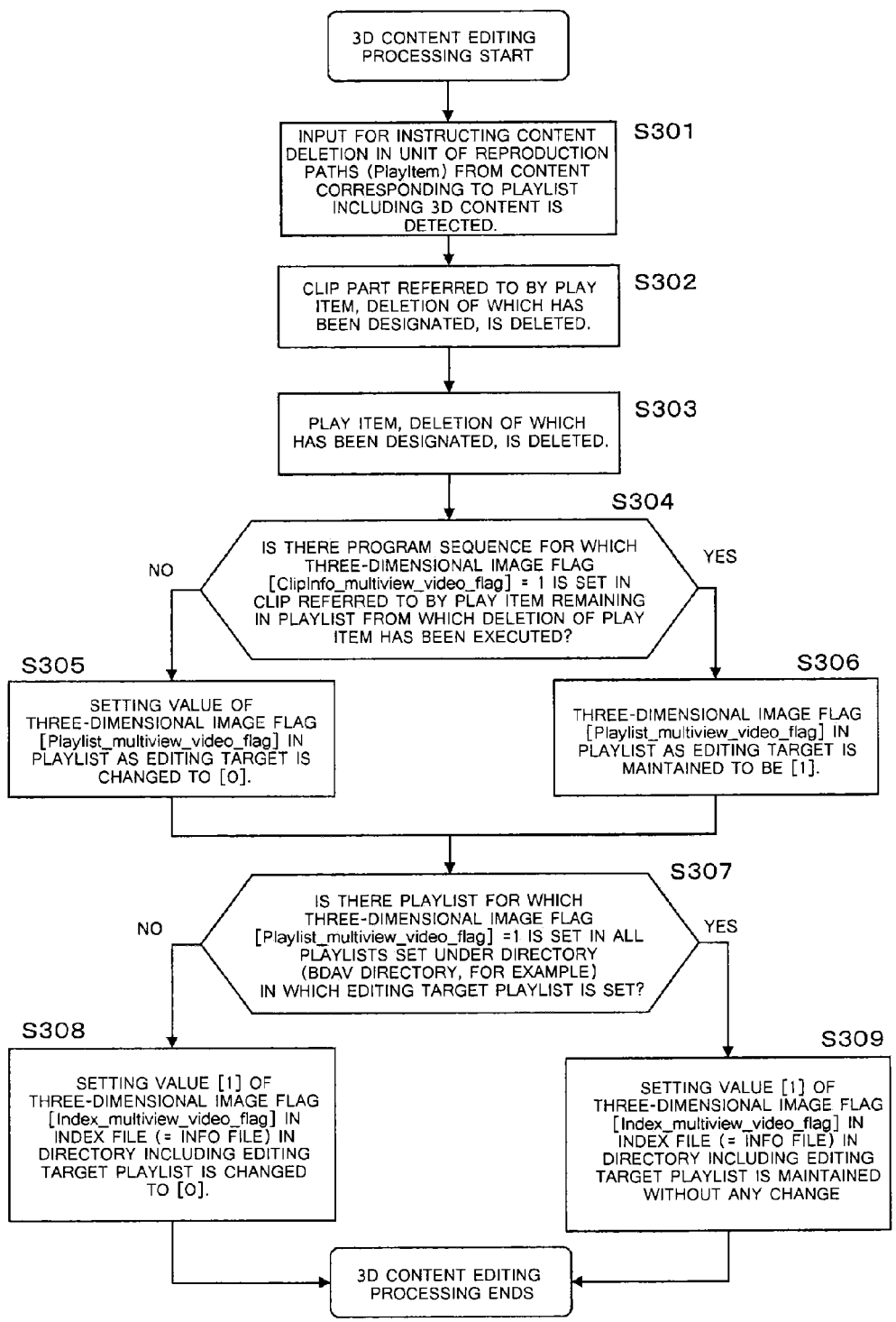
FIG. 42 is a diagram showing a flowchart illustrating a content editing processing sequence which is executed by the information processing apparatus.

The flow shown in FIG. 42 is a flow illustrating a processing sequence in the case of performing editing processing for deleting three-dimensional image content which has been already recorded in a medium.

First, in Step S301, an input for instructing deletion of content from the user is detected. The deletion of the content is performed in prescribed deletion units. Specifically, the deletion of the content is performed in units of play items as reproduction path information set in the play list.

In Step S302, a designated part of a clip (the clip information file and the AV stream file) referred to by the play item, the deletion of which has been designated, is deleted.

In Step S303, the play item, the deletion of which has been designated, is deleted.

Next, in Step S304, it is determined whether or not there is a program sequence or which the three-dimensional image flag [ClipInfo_multiview_video_flag]=1 has been set in the clip referred to by the play item remaining in the play list from which the deletion of the play item has been executed. That is, it is determined whether or not there is a program sequence with the three-dimensional image flag=1 representing that a three-dimensional image is included as three-dimensional image information of the program sequence remaining in the clip after the deletion processing.

When there is such a program sequence, the processing proceeds to Step S306, and the setting value of the three-dimensional image flag [Playlist_multiview_video_flag] in the playlist as an editing target is maintained to be [1]. That is, the three-dimensional flag=1 representing that a three-dimensional image is included in the reproduction target content in the playlist after the deletion processing is maintained as it is.

On the other hand, when it is determined in Step S304 that there is no program sequence, for which the three-dimensional image flag [ClipInfo_multiview_video_flag]=1 has been set, in the clip referred to by the play item remaining in the play list from which the play item deletion has been executed, the processing proceeds to Step S305.

In Step S305, the setting value of the three-dimensional image flag [Playlist_multiview_video_flag] in the playlist as the editing target is changed from [1] to [0]. That is, the three-dimensional image flag=0 representing that a three-dimensional image is not included in the reproduction target content in the playlist after the deletion processing is set.

Thereafter, in Step S307, it is determined whether or not there is a playlist, for which the setting value of the three-dimensional image flag [Playlist_multiview_video_flag] has been set to [1], in all playlists set under the directory (the BDAV directory shown in FIG. 3, for example) in which the editing target playlist is set. That is, it is determined whether or not a playlist for which a flag representing that the three-dimensional image is set remains. The processing proceeds to Step S309 when such a playlist remains, or the processing proceeds to Step S308 when such a playlist does not remain.

When it is determined that such a playlist remains, the setting value [1] of the three-dimensional image flag [Index_multiview_video_flag] in the info file in the directory including the playlist as the editing target is maintained without any change in Step S309. That is, the value of the flag representing that the three-dimensional image is included in the content under the management of the info file is maintained as it is.

On the other hand, when it is determined in Step S307 that there is no playlist with the three-dimensional image flag=1 in the playlists under the directory in which the editing target playlist is set, the setting value [1] of the three-dimensional image flag [Index_multiview_video_flag] in the info file in the directory including the playlist as the editing target is changed to [0] in Step S308. That is, the value of the flag representing that a three-dimensional image is not included in the content under the management of the info file is set.

(4-7. Content Reproduction Processing Sequence)

Figure 43:
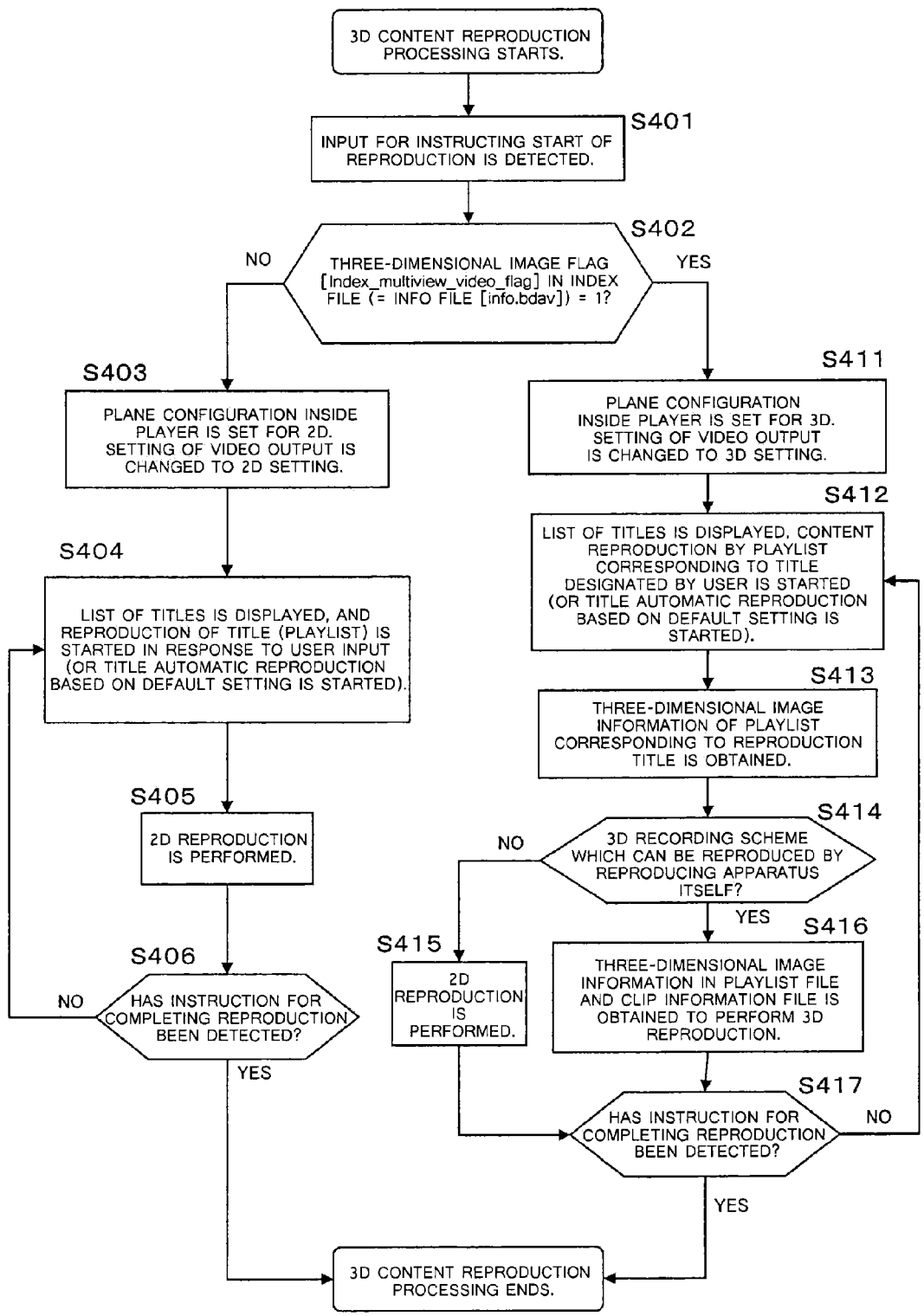
FIG. 43 is a diagram showing a flowchart illustrating a content reproduction processing sequence which is executed by the information processing apparatus.

Next, description will be given of a content reproduction processing sequence of the information processing apparatus with reference to a flowchart shown in FIG. 43.

First, in Step S401, the information processing apparatus detects an input for instructing reproduction. In addition, the instruction for content reproduction is executed by the user inputting the instruction for reproduction to an initial display menu or the like, for example.

Next, in Step S402, the information processing apparatus determines whether or not the three-dimensional image flag [Index_multiview_video_flag] in the info file=1.

The case in which the three-dimensional image flag=1 means that a three-dimensional image is included in content as a management target of the info file. In such a case, the processing proceeds to Step S411.

On the other hand, the case in which the three-dimensional image flag=0 means that a three-dimensional image is not included in the content as the management target of the info file. In such a case, the processing proceeds to Step S403.

First, description will be given of processing in Step S403 and subsequent steps. That is, description will be given of the processing in the case in which the three-dimensional image flag=0 and a three-dimensional image is not included in the content as the management target of the info file.

In such a case, processing of setting a plane configuration inside the reproducing apparatus (player), namely a reproduction processing configuration so as to execute reproduction processing of two-dimensional images and setting a video output to be an output of the two-dimensional images is performed in Step S403.

Next, in Step S404, a list of titles is displayed on a display unit, and reproduction of a title (playlist) is started in response to an input by the user. Alternatively, automatic reproduction of the title is started. In addition, the title list display is performed using data in the info file. If the user designates a specific title in the list of titles, the reproduction of the designated title is started. In addition, in the case of setting in which content corresponding to a title defined as a default in advance is reproduced regardless of whether or not the user has made a designation, the content is reproduced.

Next, in Step S405, the reproduction of the content designated by the user or the content defined in advance is executed. In such a case, 3D content is not included the content managed by the info file, and the reproduction processing of 2D content is performed.

When an instruction for completing the reproduction is not detected in Step S406, the processing in Step S404 and the subsequent steps is repeated, and the content reproduction is continued. When the instruction for completing the reproduction is detected in Step S406, the processing is terminated.

Next, description will be given of processing in Step S411 and subsequent steps. That is, description will be given of processing in the case in which the three-dimensional image flag=1 and a three-dimensional image is included in content as a management target of the info file.

In such a case, processing of setting a plane configuration inside the reproducing apparatus (player), namely a reproduction processing configuration so as to execute reproduction processing of three-dimensional images and setting a video output to be an output of the three-dimensional images is performed in Step S411.

Next, in Step S412, a list of titles is displayed on a display unit, and reproduction of a title (playlist) is started in response to an input by the user. Alternatively, automatic reproduction of the title is started. In addition, the title list display is performed using data in the info file. If the user designates a specific title in the list of titles, the reproduction of the designated title is started. In addition, in the case of setting in which content corresponding to a title defined as a default in advance is reproduced regardless of whether or not the user has made a designation, the content is reproduced.

Next, in Step S413, the three-dimensional image information set in the playlist file corresponding to the reproduction title is obtained. That is, the following information described above with reference to FIG. 11 and the like is obtained.

the three-dimensional image flag [PlayList_multiview_video_flag]
the three-dimensional image configuration information [PlayList_multiview_video_configuration]
the frame zero image identification flag [PlayList_frame0_is_Left_flag]
the base image identification flag [PlayList_base_view_is_Left_flag]
the main path image identification flag [PlayList_MainPath_is_Left_flag]
the coding state identification flag [PlayList_use_entropy_coding_mode_flag]
the inter-image reference identification flag [PlayList_use_inter-view_prediction_flag]

In addition, the reproducing apparatus firstly refers to the three-dimensional image flag [PlayList_multiview_video_flag] and the three-dimensional image configuration information [PlayList_multiview_view_configuration].

In the three-dimensional image configuration information, the coding state information described above with reference to FIG. 13 is recorded. The reproducing apparatus firstly determined whether or not reproduction of the coded data can be executed in the apparatus itself, based on the three-dimensional image configuration information.

As described above with reference to FIG. 13, the information on based on which one of the following coding state the three-dimensional image as the recorded data is recorded is set in the three-dimensional image information.
the value=3: side by side scheme
the value=4: top and bottom scheme
the value=5: frame sequential scheme
the value=30: MVC coding two-elementary stream/one-system stream (one-clip AV stream)
the value=31: MVC coding two-elementary stream/two-system stream (two-clip AV stream)
the value=32: MVC coding one-elementary stream/one-system stream (one-clip AV stream)
the value=40: independent two-elementary stream/one-system stream (one-clip AV stream) (not MVC coding)
the value=41: independent two-elementary stream/two-system stream (two-clip AV stream) (not MVC coding)

The reproducing apparatus determined whether or not reproduction of the coded data can be executed in the apparatus itself, based on the three-dimensional image configuration information.

In addition, in the case of the setting of the three-dimensional image configuration information=30 to 32, it is further determined whether or not reproduction of the coded data can be executed in the apparatus itself referring to the coding state identification flag.

That is, the coding state identification flag is an identification flag representing whether or not the coding processing using the entropy coding mode has been executed as the coding processing, as described above with reference to FIG. 18.

The coding processing using the entropy coding mode is specifically coding mode using CABAC (Context-based Adaptive Binary Arithmetic Coding), for example.

The coding processing without using the entropy coding mode is specifically coding mode using CAVLC (Context-based Adaptive Variable Length Coding), for example.

In the case of the setting of the three-dimensional image configuration information=30 to 32, the reproducing apparatus further determines whether or not the reproduction of the coded data can be executed in the apparatus itself referring to the coding state identification flag.

When it is determined in Step S414 that the reproduction processing of the coded data cannot be executed in the apparatus itself, the processing proceeds to Step S415, and the reproduction processing of the two-dimensional image is executed with the application of the three-dimensional image. This processing is an exceptional processing, and reproduction processing using only the L image, for example, as the reproduction data is executed.

On the other hand, when it is determined in Step S414 that the reproduction processing of the coded data can be executed in the apparatus itself, the processing proceeds to Step S416, and the reproduction processing of a taste source image is executed. In addition, in this reproduction processing, the reproduction processing is performed by executing optimal processing corresponding to reference information referring to the three-dimensional information set in the playlist file and the clip information file.

In addition, the three-dimensional image information is set in the clip information file in units of program sequences, and when shifting of the program sequences is executed, the three-dimensional image information to be referred to is also shifted, and the processing is executed.

When the instruction for completing the reproduction is not detected in Step S417, the processing in Step S412 and the subsequent steps is repeated, and the content reproduction is continued. When the instruction for completing the reproduction is detected in Step S417, the processing is terminated.

In addition, a configuration is also applicable in which processing of displaying determination information based on the three-dimensional image identification flag included in the management information file such as the info file or the playlist file, namely determination information on whether or not there is a possibility of a three-dimensional image being included is displayed on the display unit in performing the display processing of the list of the titles, which is executed in Steps S404 and S412.

For example, in relation to the determination information on whether or not there is a possibility of a three-dimensional image being included in content stored on the entire recording medium, it is possible to perform processing of displaying the determination information based on the three-dimensional image identification flag in the info file, and in relation to whether or not there is a possibility of a three-dimensional image being included in units of titles of content stored in the recording medium, it is possible to perform processing of displaying the determination information based on the three-dimensional image identification flag in the playlist file. The user can determine, based on the display, the presence/absence of the three-dimensional image in the entire medium or in units of titles.

[5. Concerning Configuration Example of Information Processing Apparatus]

Next, a configuration example of the information processing apparatus which executes the aforementioned recording and reproducing processing will be described with reference to FIG. 44. FIG. 44 is a block diagram showing a configuration example of an information processing apparatus 400 according to an embodiment of the present invention. The information processing apparatus 400 is an apparatus which performs processing of at least one of recording data in a medium 410 and reproducing the data. Specifically, the information processing apparatus 400 is an apparatus such as a recording and reproducing apparatus, a player apparatus, a recorder apparatus, a video camera, or a PC.

In addition, although a disc-type medium is shown as the medium 410 in FIG. 44, the medium is not limited to such a disc-type medium, and a medium such as a flash memory can be applied.

The information processing apparatus 400 includes a data processing unit (recording and reproducing processing unit) 401, a memory 402, an input unit 403, an output unit 404, a medium interface 405, and a local storage unit 406 as shown in FIG. 44.

The data processing unit 401 includes a CPU which has a program executing function for executing various data processing programs. For example, the CPU executes an application program for performing data recording and reproducing processing. For example, the CPU executes processing based on the flowcharts shown in FIGS. 37 to 43.

The memory 402 is configured by a RAM, ROM, or the like and is used as a storage area of the application program and the like to be executed by the data processing unit 401. In addition, the memory 402 is also used as a parameter area and a work area for applications and further used as a buffer area of medium recording data.

The input unit 403 is a user operation unit, for example, and various inputs such as inputs for recording data and instructing reproduction are performed thereon. In addition, a remote controller is also included in the input unit 403, and it is possible to input remote controller operating information. The output unit 404 is an output unit of images and audio configured by a display, a speaker, and the like.

The medium interface 405 is an interface applied to data recording and reproduction processing using the medium 410. In response to a request from the data processing unit 401, the medium interface 405 writes data on the medium 410 or performs processing of reading data from the medium 410.

The local storage unit 406 is configured by a hard disk, for example. The local storage unit 406 is used as a storage area of various kinds of data such as content and programs, for example.

As described above, the detailed description was given of the present invention with reference to the specific embodiments. However, it is obvious that various modifications and alternations of the embodiments can be made by those skilled in the art without departing from the scope of the present invention. That is, the form of present invention disclosed herein is illustrative only and should not be exclusively understood. In order to determine the scope of the present invention, claims should be taken into account.

In addition, the series of processing described in this specification can be executed by hardware, software, or in a combination thereof. In the case of executing the processing by software, it is possible to install a program recording the processing sequence in a memory in a computer installed in dedicated hardware and execute the program, or alternatively, it is possible to install the program in a general computer capable of executing various kinds of processing and cause the computer to execute the program. For example, the program can be stored in advance on a recording medium. The program can be received via a network such as a LAN (Local Area Network) or the Internet and installed on a recording medium such as a built-in hard disk as well as the installation from the recording medium to the computer.

In addition, the various kinds of processing described in the specification may be executed not only in a temporal manner in the order of the description but also in parallel or individually depending on a processing capability of the apparatus which executes the processing, or depending on necessity. In addition, the system in this specification is a logical collective configuration of a plurality of apparatuses and is not limited to a configuration in which the apparatuses as components are in the same case body.

INDUSTRIAL APPLICABILITY

As described above, according to an embodiment of the present invention, a data recording and reproducing configuration capable of easily determining whether or not a three-dimensional image is included in data stored on a recording medium is realized. In processing of recording data in the recording medium, three-dimensional image discrimination data representing whether or not there is a possibility of a three-dimensional image being included in the recorded data is recorded as management information. Specifically, the three-dimensional image discrimination data is recorded in a clip information file set in association with a stream file as a storage file of image data, a playlist file including reproduction section designating information for the clip information file, an info file including registration information of the playlist file, and the like. With such a configuration, a reproducing apparatus can easily determine the presence/absence of a three-dimensional image without performing analysis on reproduction target data.

REFERENCE SIGNS LIST

101 UI information [UIAppInfoBDAV( )]
102 Playlist information [TableOfPlayLists( )]
103 Maker private data area [MakersPrivateData( )]
111 Maker ID [maker_ID] recording area
112 Maker model code [maker_model_code] recording area
113 Data block [data_block] recording area
115 Flag information [Index_multiview_video_flag]
121 Three-dimensional image flag [PlayList_Multiview_video_flag]
122 Three-dimensional image configuration information [PlayList_multiview_video_configuration]
123 Frame zero image identification flag [PlayList_frame0_is_Left_flag]
124 Base image identification flag [PlayList_base_view_is_Left_flag]
125 Main path image identification flag [PlayList_MainPath_is_Left_flag]
126 Coding state identification flag [PlayList_use_entropy_coding_mode_flag]
127 Inter-image reference identification flag [PlayList_use_inter-view_prediction_flag]
130 Playlist
131 Main path (main play item)
132 Sub path (sub play item)
135 Clip a
136 Clip b
141 Main path (play item) information recording area
142 Sub path (sub play item) information recording area
145 Sub path (sub play item) type information recording area
201 ClipInfo
202 SequenceInfo
203 ProgramInfo
204 CPI
205 ClipMark
206 MakersPrivateData
210 EP map
220 Program sequence number (number_of_program_sequences)
221 Three-dimensional image flag [ClipInfo_multiview_video_flag]

222 Three-dimensional image configuration information [ClipInfo_multiview_video_configuration]
223 Frame zero image identification flag [ClipInfo_frame0_is_Left_flag]
224 Base image identification flag [ClipInfo_base_view_is_Left_flag]
225 Clip corresponding image identification flag [ClipInfo_this_Clip_is_Left_flag]
226 Coding state identification flag [ClipInfo_use_entropy_coding_mode_flag]
227 Inter-image reference identification flag [ClipInfo_use_inter-view_prediction_flag]
400 Information processing apparatus
401 Data processing unit (recording and reproducing unit)
402 Memory
403 Input unit
404 Output unit
405 Medium interface
406 Local storage unit
410 Medium

The invention claimed is:

1. An information processing apparatus comprising:
a data processing unit implemented by circuitry and configured to perform processing of recording data on a recording medium,
wherein the data processing unit executes processing of recording three-dimensional image discrimination data in each of hierarchized management information files in the processing of recording data in the recording medium,
wherein the image discrimination data represents two cases corresponding to whether or not there is a possibility of a three-dimensional image being included in recorded data in units of management data for each of the hierarchized management information files,
wherein a first case of the two cases, in which there is a possibility of the three-dimensional image of the three-dimensional image being included in the recorded data in units of management data, includes a first sub-case in which the three-dimensional image is not actually included in the recorded data, and a second sub-case in which the three-dimensional image is actually included in the recorded data, and a second case of the two cases, in which there is no possibility of the three-dimensional image of the three-dimensional image being included in the recorded data in units of management data, includes one sub-case in which the three-dimensional image is not included in the recorded data, and
wherein the hierarchized management information files include playlist files including reproduction section designating information for the clip information files.

2. The information processing apparatus according to claim 1,
wherein the data processing unit records the three-dimensional image discrimination data in a different management information file from the recording file which stores three-dimensional image data therein.

3. The information processing apparatus according to claim 1,
wherein the data processing unit records the three-dimensional image discrimination data in all management information files shown from (a) to (c):
(a) clip information files set in association with stream files as storage files of image data;
(b) playlist files including reproduction section designating information for the clip information files; and
(c) disc management files for management of an entire disc.

4. The information processing apparatus according to claim 3,
wherein the data processing unit records three-dimensional image discrimination data representing that there is a possibility of a three-dimensional image being included in the clip information file when there is a possibility that the three-dimensional image is included in the stream file associated with the clip information file,
wherein the data processing unit records three-dimensional image discrimination data representing that there is a possibility of a three-dimensional image being included in the playlist file when there is a possibility that the three-dimensional image is included in the stream file reproduced using the playlist file, and
wherein the data processing unit records three-dimensional image discrimination data representing that there is a possibility of a three-dimensional image being included in the info file when there is a possibility that the three-dimensional image is included in a stream file reproduced using a playlist managed by the disc management file.

5. The information processing apparatus according to claim 1,
wherein the data processing unit records a flag, to which different values are set, as the three-dimensional image discrimination data when there is a possibility of a three-dimensional image being included in recorded data and when there is no possibility of a three-dimensional image being included in the recorded data.

6. An information processing apparatus comprising:
a data processing unit which performs processing of reproducing data from a recording medium,
wherein the data processing unit sequentially reads three-dimensional image discrimination data from each of hierarchized management information files and executes processing of determining between two cases corresponding to whether or not there is a possibility of a three-dimensional image being included in reproduction data in units of management data for each of the hierarchized management information files based on the read three-dimensional image discrimination data, in processing of reproducing data from the recording medium,
wherein a first case of the two cases, in which there is a possibility of the three-dimensional image of the three-dimensional image being included in the recorded data in units of management data, includes a first sub-case in which the three-dimensional image is not actually included in the recorded data, and a second sub-case in which the three-dimensional image is actually included in the recorded data, and a second case of the two cases, in which there is no possibility of the three-dimensional image of the three-dimensional image being included in the recorded data in units of management data, includes one sub-case in which the three-dimensional image is not included in the recorded data, and
wherein the hierarchized management information files include playlist files including reproduction section designating information for the clip information files.

7. The information processing apparatus according to claim 6,
wherein the three-dimensional image discrimination data is set in each of the management information files shown from (a) to (c):

(a) clip information files set in association with stream files as storage files of image data;
(b) playlist files including reproduction section designating information for the clip information files; and
(c) disc management files for management of an entire disc, and wherein the data processing unit refers to the three-dimensional image discrimination data set in the management information files selected in accordance with reproduction data in an order from an info file, a play list file, and then a clip information file and determines whether or not there is a possibility of a three-dimensional image being included in the reproduction data in units of management data in each of the management information files.

8. The information processing apparatus according to claim 6,
wherein the data processing unit sets a reproduction processing configuration of the information processing apparatus to a three-dimensional image reproduction processing configuration when it is determined that there is a possibility of a three-dimensional image being included in reproduction data in the processing of referring to the three-dimensional image discrimination data, and
wherein the data processing unit performs processing of setting the reproduction processing configuration of the information processing apparatus to a two-dimensional image reproduction processing configuration when it is determined that a three-dimensional image is not included in the reproduction data.

9. The information processing apparatus according to claim 6,
wherein the data processing unit performs processing of determining whether or not there is a possibility of a three-dimensional image being included in reproduction data in the processing of referring to the three-dimensional image discrimination data and displaying determination information on a display unit.

10. The information processing apparatus according to claim 9,
wherein the data processing unit performs processing of displaying determination information on whether or not there is a possibility of a three-dimensional image being included in reproduction data in units of titles of content stored in the recording medium.

11. A non-transitory information recording medium which stores image data, comprising, as recorded data:
a stream file which stores content as a reproduction target; and
management information files with a hierarchy configuration, in which management information of the content is stored,
wherein each of the hierarchized management information files has a configuration in which three-dimensional image discrimination data representing two cases corresponding to whether or not there is a possibility of a three-dimensional image being included in the content,
wherein a first case of the two cases, in which there is a possibility of the three-dimensional image of the three-dimensional image being included in the recorded data in units of management data, includes a first sub-case in which the three-dimensional image is not actually included in the recorded data, and a second sub-case in which the three-dimensional image is actually included in the recorded data, and a second case of the two cases, in which there is no possibility of the three-dimensional image of the three-dimensional image being included in the recorded data in units of management data, includes one sub-case in which the three-dimensional image is not included in the recorded data,
wherein a reproducing apparatus which reproduces the content has a configuration with which it is possible to determine whether or not there is a possibility of a three-dimensional image being included in recorded content in the information recording medium in units of management data for each of the management information files by sequentially referring to the three-dimensional image discrimination data based on a hierarchy of the management information files, and
wherein the hierarchized management information files include playlist files including reproduction section designating information for the clip information files.

12. The information recording medium according to claim 11,
wherein the three-dimensional image discrimination data is set in each of the management information files shown from (a) to (c):
(a) clip information files set in association with stream files as storage files of image data;
(b) playlist files including reproduction section designating information for the clip information files; and
(c) disc management files for management of an entire disc, and
wherein the reproducing apparatus is capable of referring to the three-dimensional image discrimination data set in the management information files selected in accordance with reproduction data in an order from a disc management file, a play list file, and then a clip information file and determining whether or not there is a possibility of a three-dimensional image being included in the reproduction data in units of management data in each of the management information files.

13. An information processing method for executing processing of recording data on a recording medium by an information processing apparatus, the method comprising:
executing, using data processing circuitry of the information processing apparatus, processing of recording three-dimensional image discrimination data in each of management information files in processing of recording data on the recording medium, the image discrimination data representing two cases corresponding to whether or not there is a possibility of a three-dimensional image being included in recorded data in units of management data for each of the hierarchized management information files, wherein a first case of the two cases, in which there is a possibility of the three-dimensional image of the three-dimensional image being included in the recorded data in units of management data, includes a first sub-case in which the three-dimensional image is not actually included in the recorded data, and a second sub-case in which the three-dimensional image is actually included in the recorded data, and a second case of the two cases, in which there is no possibility of the three-dimensional image of the three-dimensional image being included in the recorded data in units of management data, includes one sub-case in which the three-dimensional image is not included in the recorded data, and the hierarchized management information files including playlist files including reproduction section designating information for the clip information files.

14. An information processing method for executing processing of reproducing data from a recording medium by an information processing apparatus, the method comprising:

executing, using data processing circuitry of the information processing apparatus, processing of sequentially reading three-dimensional image discrimination data recorded in each of hierarchized management information files, which are stored on the recording medium; and determining between two cases corresponding to whether or not there is a possibility of a three-dimensional image being included in reproduction data in units of management data for each of the management information files based on the read three-dimensional image discrimination data, wherein a first case of the two cases, in which there is a possibility of the three-dimensional image of the three-dimensional image being included in the recorded data in units of management data, includes a first sub-case in which the three-dimensional image is not actually included in the recorded data, and a second sub-case in which the three-dimensional image is actually included in the recorded data, and a second case of the two cases, in which there is no possibility of the three-dimensional image of the three-dimensional image being included in the recorded data in units of management data, includes one sub-case in which the three-dimensional image is not included in the recorded data, the hierarchized management information files including playlist files including reproduction section designating information for the clip information files.

15. A non-transitory computer readable medium storing thereon a program which causes an information processing apparatus to execute processing of recording data on a recording medium, the program causing a data processing unit to execute:

processing of recording three-dimensional image discrimination data in each of management information files in processing of recording data in the recording medium, the image discrimination data representing two cases corresponding to whether or not there is a possibility of a three-dimensional image being included in recorded data in units of management data for each of the hierarchized management information files, wherein a first case of the two cases, in which there is a possibility of the three-dimensional image of the three-dimensional image being included in the recorded data in units of management data, includes a first sub-case in which the three-dimensional image is not actually included in the recorded data, and a second sub-case in which the three-dimensional image is actually included in the recorded data, and a second case of the two cases, in which there is no possibility of the three-dimensional image of the three-dimensional image being included in the recorded data in units of management data, includes one sub-case in which the three-dimensional image is not included in the recorded data, and the hierarchized management information files including playlist files including reproduction section designating information for the clip information files.

16. A non-transitory computer readable medium having stored thereon a program which causes an information processing apparatus to execute processing of reproducing data from a recording medium, the program causing a data processing unit to:

sequentially read three-dimensional image discrimination data stored in each of hierarchized management information files, which are stored in the recording medium; and execute processing of determining between two cases corresponding to whether or not there is a possibility of a three-dimensional image being included in reproduction data in units of management data for each of the management information files based on the read three-dimensional image discrimination data, wherein a first case of the two cases, in which there is a possibility of the three-dimensional image of the three-dimensional image being included in the recorded data in units of management data, includes a first sub-case in which the three-dimensional image is not actually included in the recorded data, and a second sub-case in which the three-dimensional image is actually included in the recorded data, and a second case of the two cases, in which there is no possibility of the three-dimensional image of the three-dimensional image being included in the recorded data in units of management data, includes one sub-case in which the three-dimensional image is not included in the recorded data, the hierarchized management information files including playlist files including reproduction section designating information for the clip information files.

\* \* \* \* \*